United States Patent [19]

Yoshikawa et al.

[11] 4,163,121
[45] Jul. 31, 1979

[54] RADIO CHANNEL CONTROL SYSTEM FOR MOBILE RADIO TELEPHONE SYSTEMS

[75] Inventors: Noriaki Yoshikawa, Yokosuka; Hitoshi Komagata, Yokohama; Yoshio Sato, Tokyo, all of Japan

[73] Assignees: Nippon Telegraph and Telephone Public Corporation; Nippon Electric Co., Ltd., both of Tokyo, Japan

[21] Appl. No.: 829,061

[22] Filed: Aug. 30, 1977

[30] Foreign Application Priority Data

Aug. 30, 1976 [JP] Japan .................................. 51-102612

[51] Int. Cl.² ............................................. H04Q 7/00
[52] U.S. Cl. .................................................... 179/2 EB
[58] Field of Search ..................... 179/2 EB; 325/364; 307/360

[56] References Cited

U.S. PATENT DOCUMENTS

| | | | |
|---|---|---|---|
| 3,663,762 | 5/1972 | Joel, Jr. | 179/2 EB |
| 3,898,390 | 8/1975 | Wells et al. | 179/2 EB |

OTHER PUBLICATIONS

"Transmission Systems For Communications", Bell Telephone Laboratories, (Western Elec. Co., 1970), pp. 123, 124, 139.

Primary Examiner—Kathleen H. Claffy
Assistant Examiner—Kenneth A. Chayt
Attorney, Agent, or Firm—Charles E. Pfund

[57] ABSTRACT

In a mobile telephone system of the type in which the service area of the system is divided into a plurality of radio zones, mobile-system base stations are installed in respective radio zones, each mobile-system base station is connected to a mobile-system control unit through a common control channel and a plurality of speech channels, and the mobile-system control unit is connected to an existing telephone network via a mobile-system exchange unit, there are provided signal lines extending between the mobile-system base stations and the mobile-system control unit and between the mobile-system control unit and the mobile-system exchange unit and respectively combined with each of the speech channels. These signal lines are used to determine the state of the speech channels, and to transmit control and information signals.

20 Claims, 24 Drawing Figures

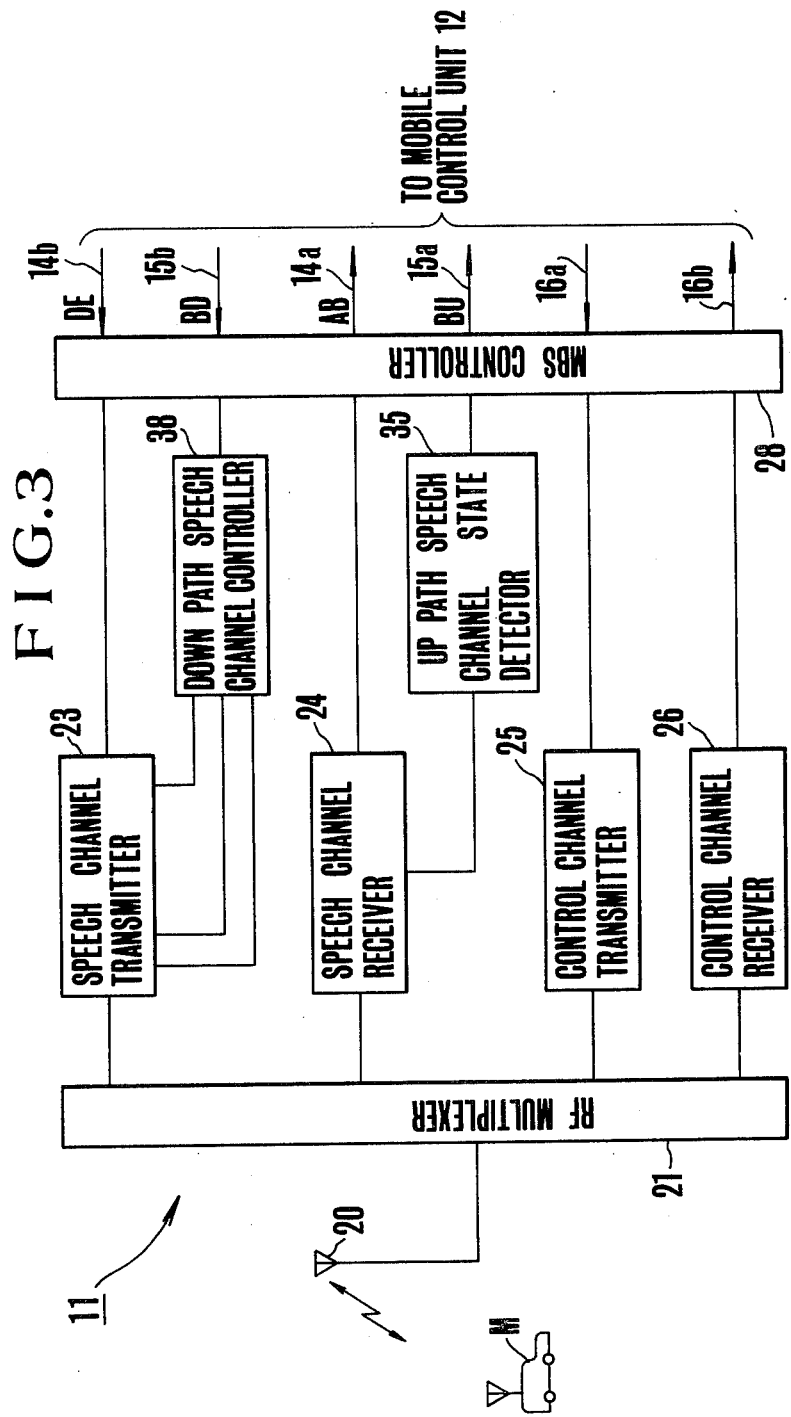

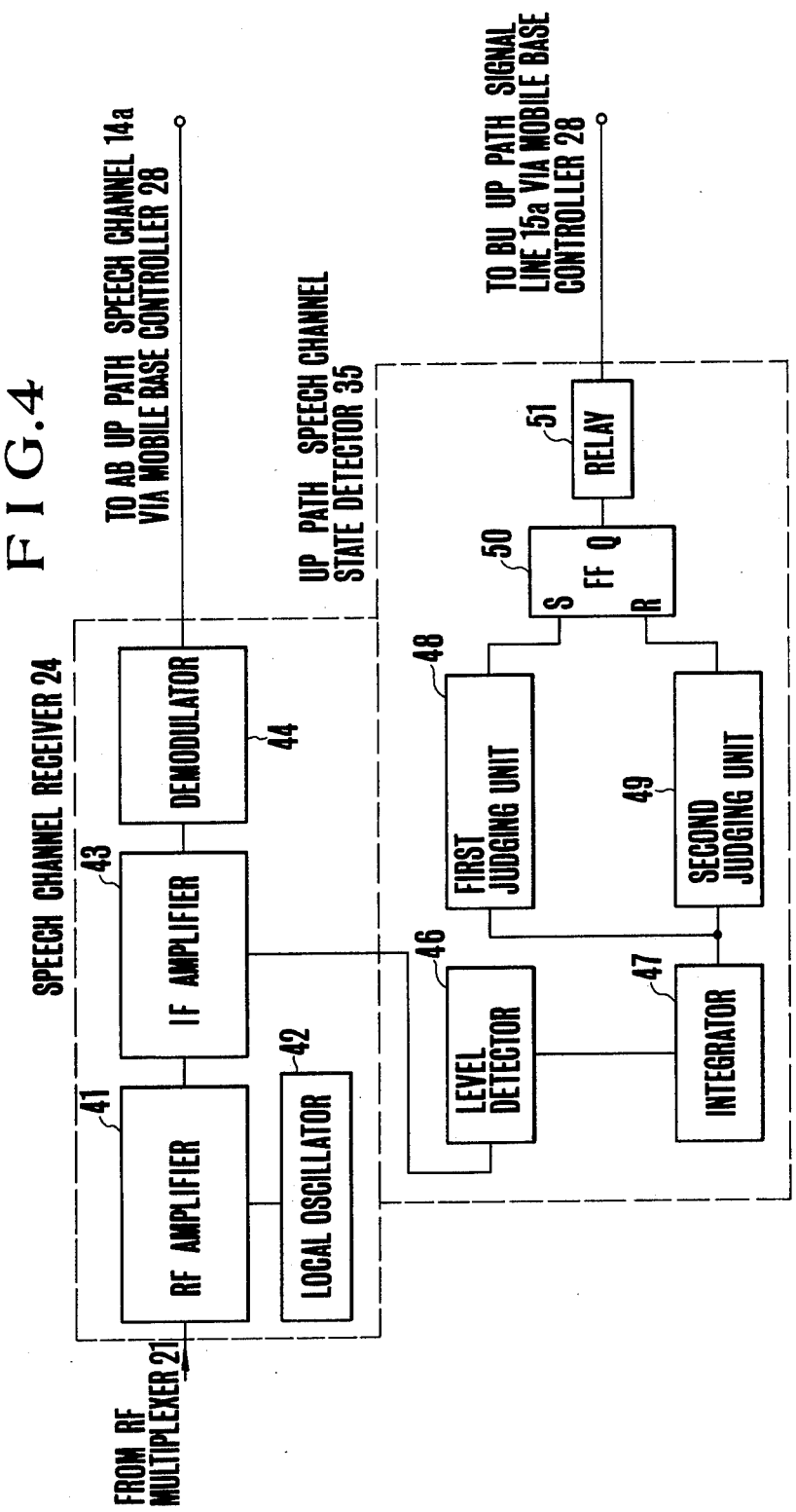

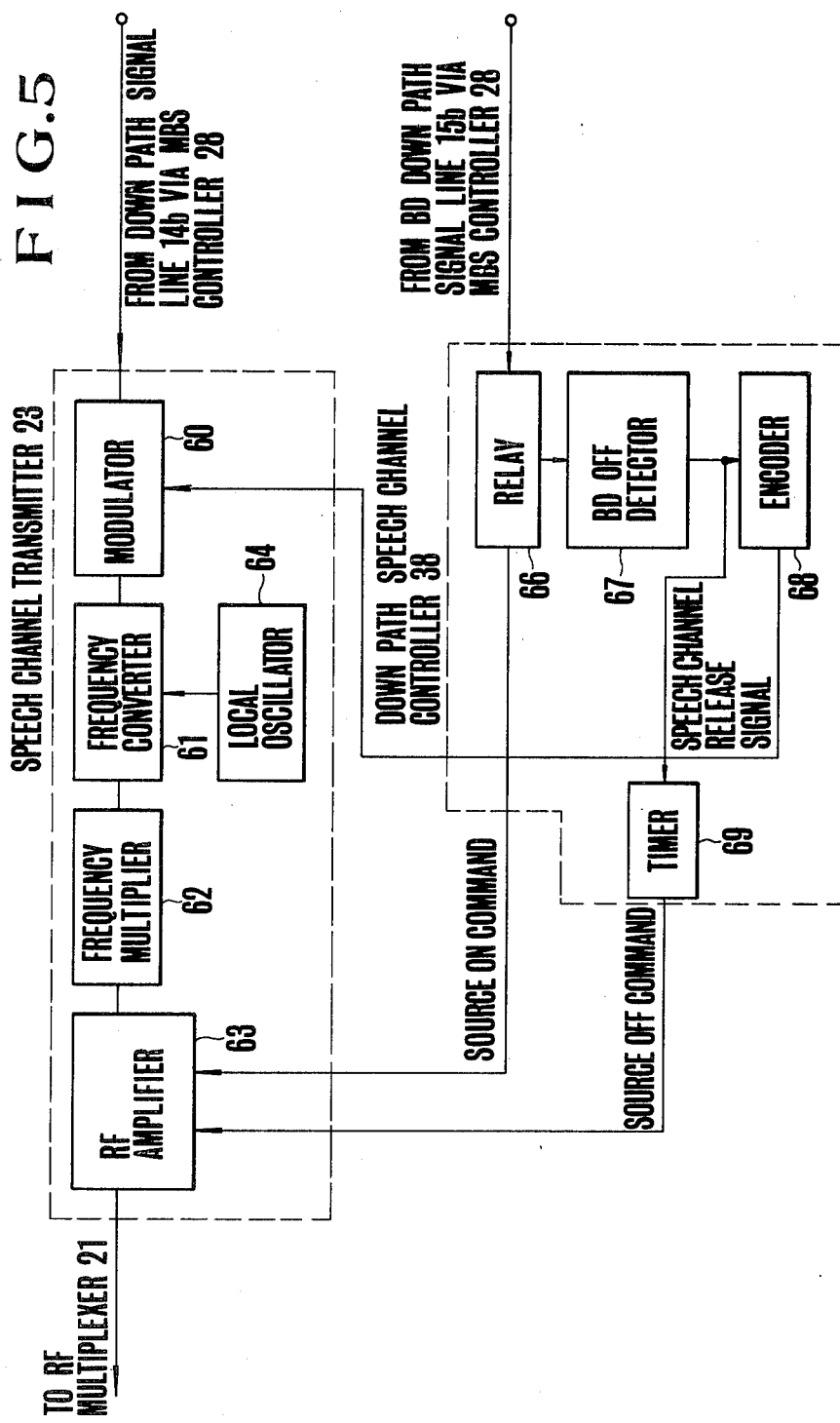

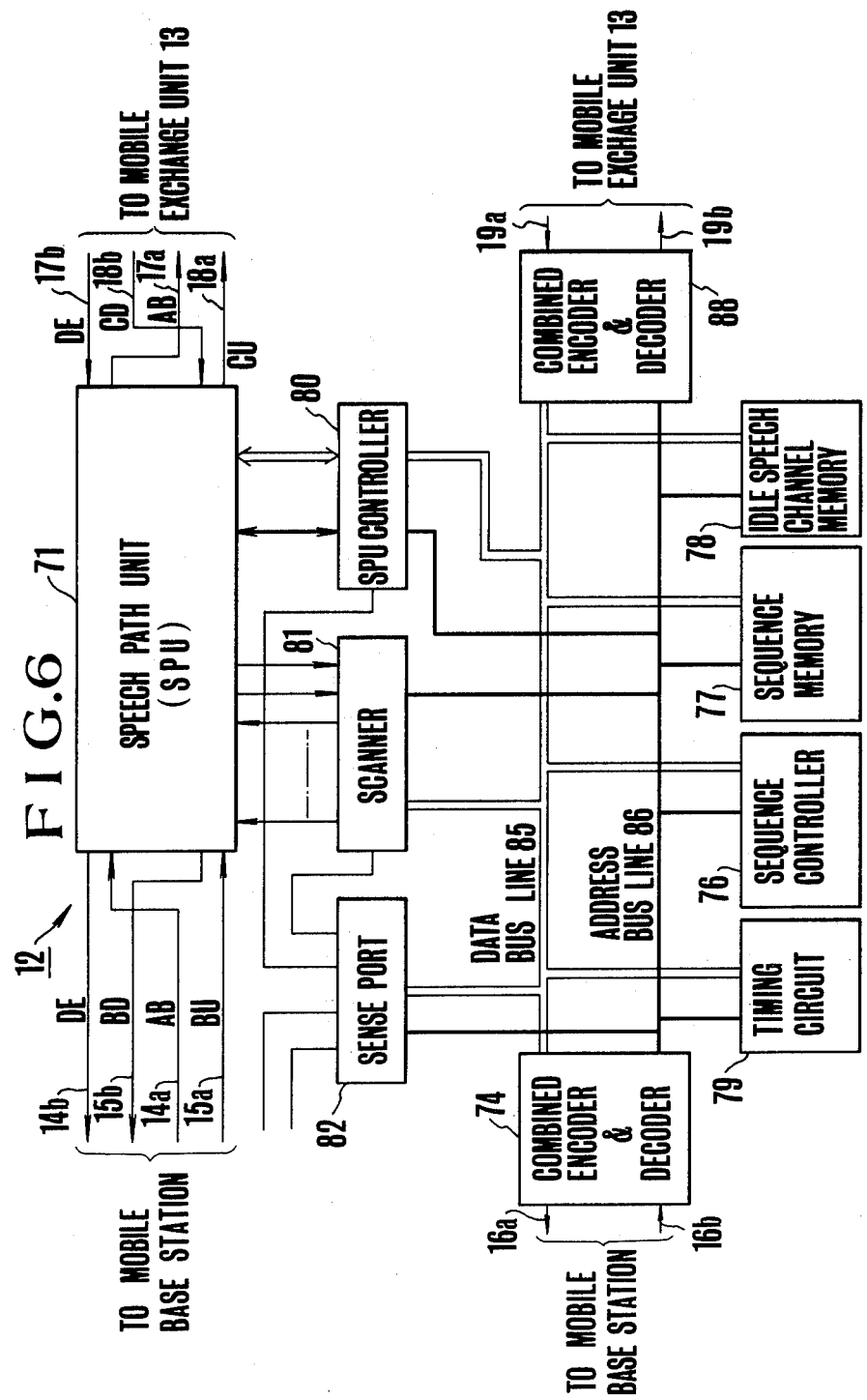

FIG. 7A

| PREAMBLE INFORMATION | START INFORMATION | SIGNAL TYPE INFORMATION | MOBILE STATION IDENTIFICATION NUMBER INFORMATION |
|---|---|---|---|

FIG. 7B

| START INFORMATION | SIGNAL TYPE INFORMATION | MOBILE STATION IDENTIFICATION NUMBER INFORMATION | RECEIVED SIGNAL LEVEL |
|---|---|---|---|

FIG. 7C

| SIGNAL TYPE INFORMATION | MOBILE STATION IDENTIFICATION NUMBER INFORMATION | IDLE SPEECH CHANNEL NUMBER INFORMATION (FREQ. CODE) |
|---|---|---|

FIG. 7D

| SIGNAL TYPE INFORMATION | MOBILE STATION IDENTIFICATION NUMBER INFORMATION | SPEECH CHANNEL NUMBER INFORMATION (MBSNo.+CHNo.) |
|---|---|---|

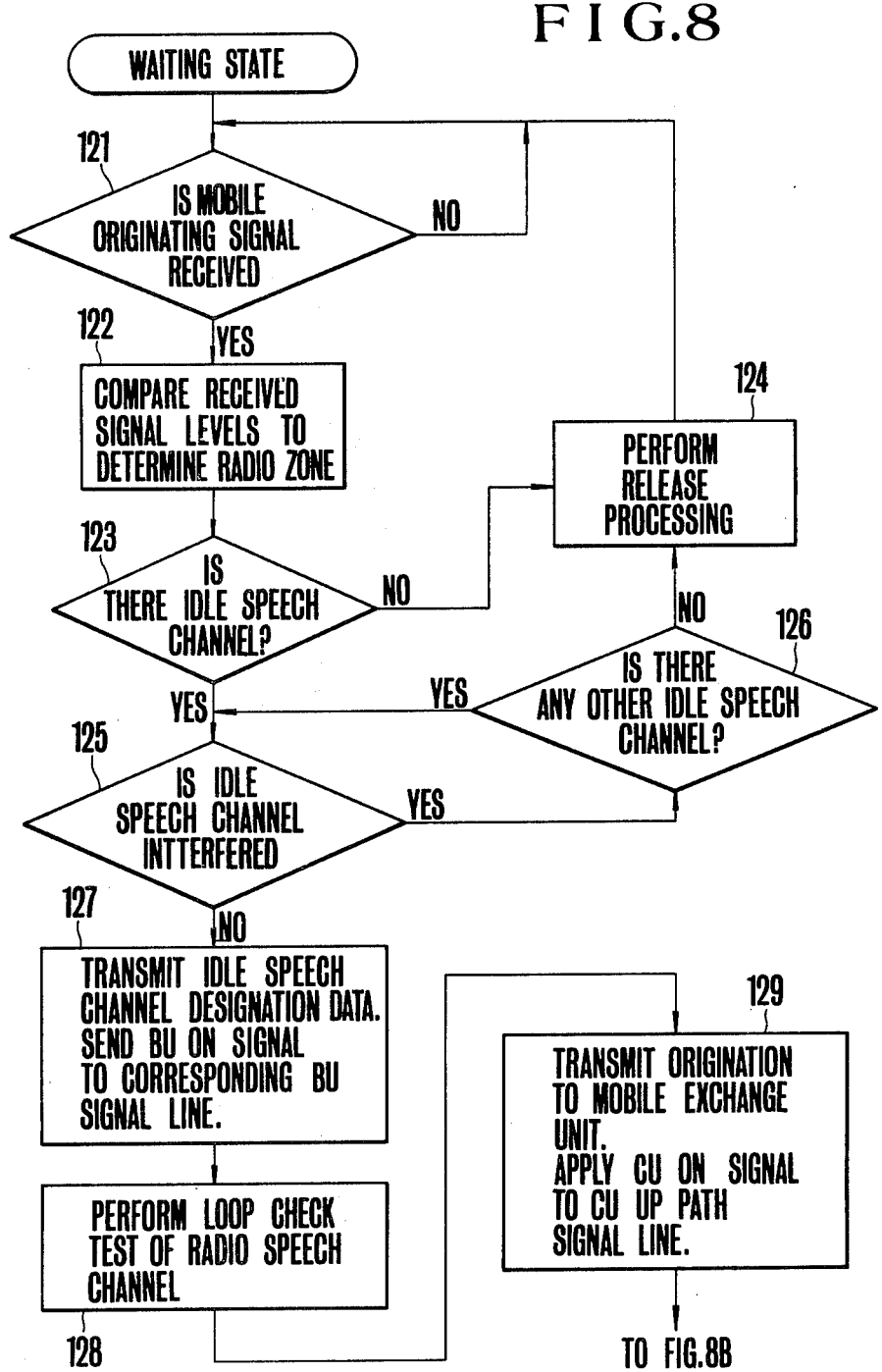

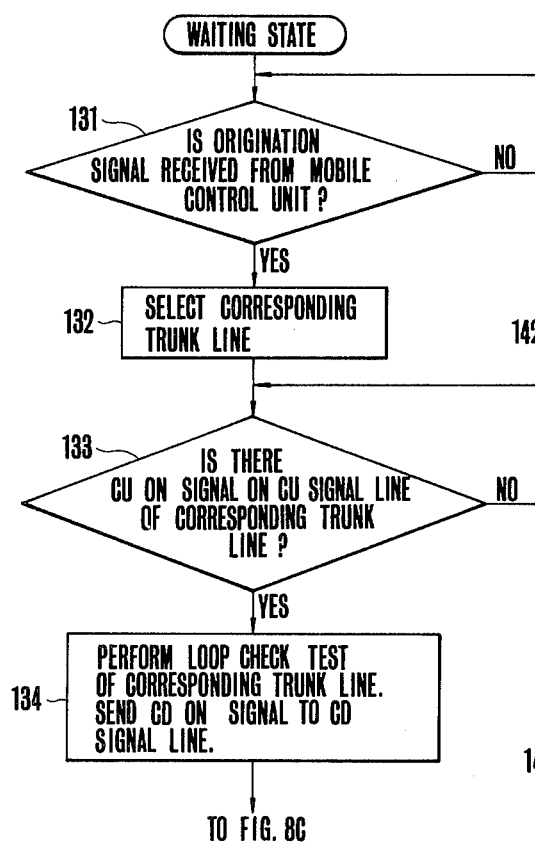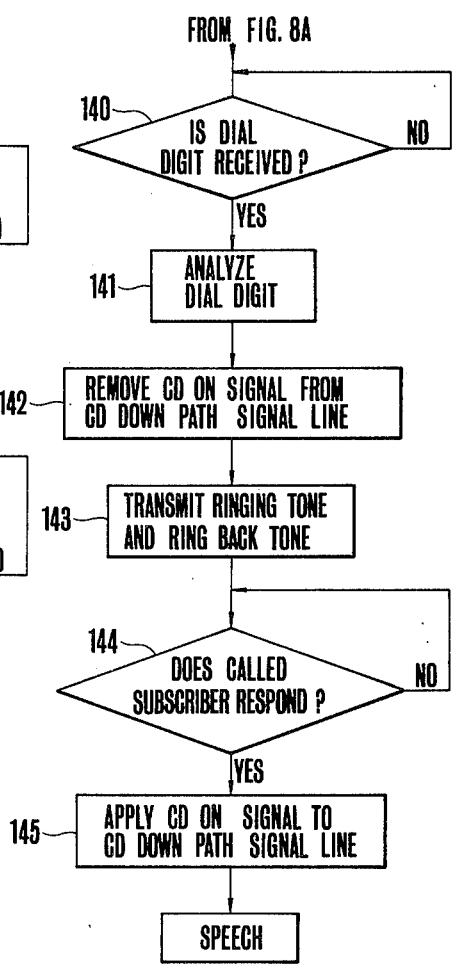

FIG. 9A

| SIGNAL TYPE INFORMATION | MOBILE STATION NUMBER INFORMATION |
|---|---|

FIG. 9B

| PREAMBLE INFORMATION | START INFORMATION | SIGNAL TYPE INFORMATION | MOBILE STATION NUMBER INFORMATION |
|---|---|---|---|

FIG. 9C

| SIGNAL TYPE INFORMATION | MOBILE STATION NUMBER INFORMATION | IDLE SPEECH CHANNEL NUMBER INFORMATION (FREQ. CODE) |
|---|---|---|

FIG. 9D

| SIGNAL TYPE INFORMATION | MOBILE STATION NUMBER INFORMATION | SPEECH CHANNEL NUMBER INFORMATION (MBSNo.+CHNo.) |
|---|---|---|

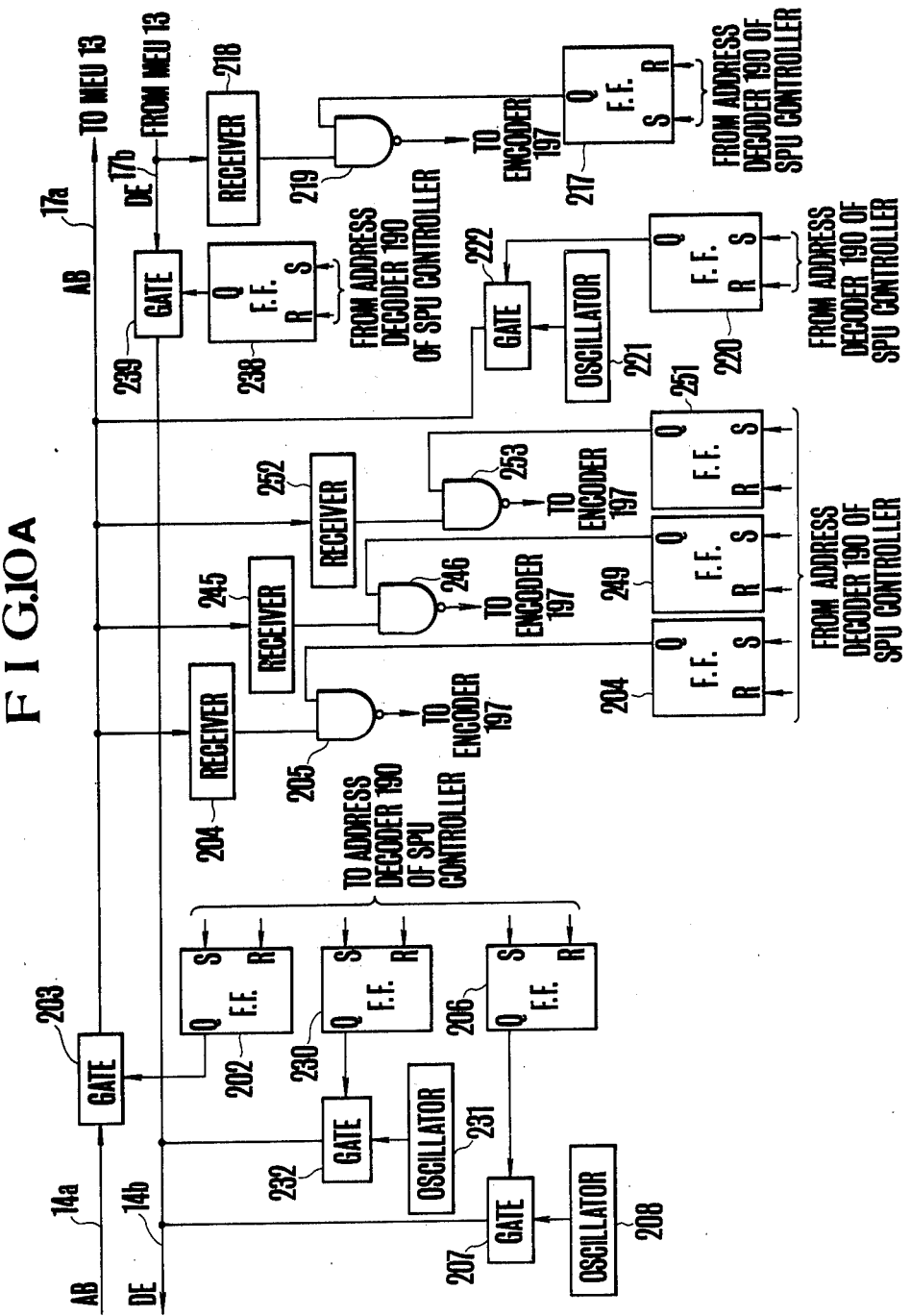

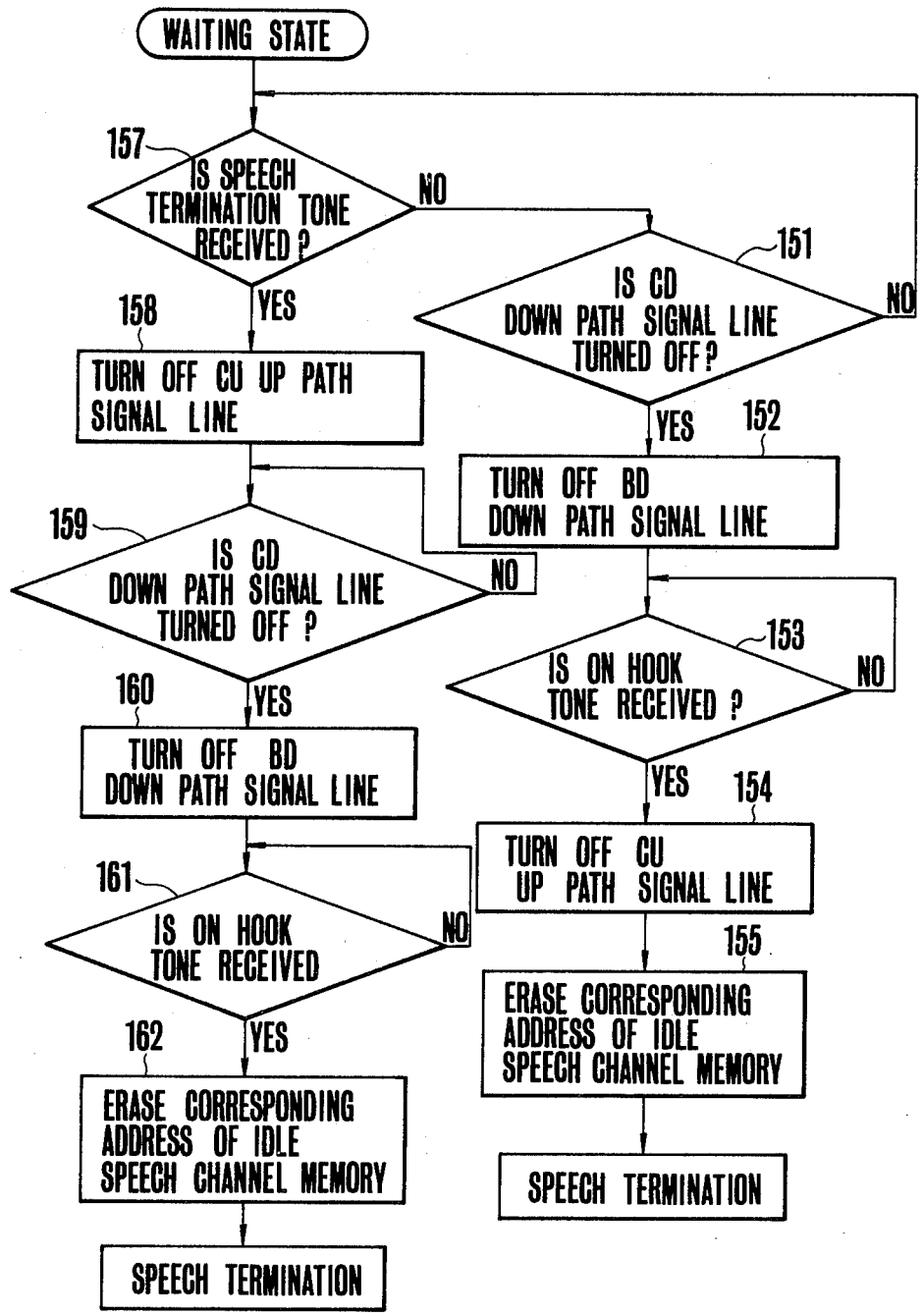
F I G.12

RADIO CHANNEL CONTROL SYSTEM FOR MOBILE RADIO TELEPHONE SYSTEMS

BACKGROUND OF THE INVENTION

This invention relates to a system of controlling radio channels of a mobile radio telephone system.

With increased activity of human living, the requirements for communicating between vehicles such as motor cars, ships, trains, etc. by utilizing existing ordinary telephone networks, have been increasing and various mobile radio telephone systems have been developed to fulfil such requirements.

Among these systems, a system is now being used wherein a service area of the system is divided into a plurality of radio zones, a mobile-system base station (MBS) is installed in each radio zone, and the mobile-system base stations are connected to a mobile-system control unit (MCU) through a common control channel and speech channels each consisting of four lines whereby the mobile-system base stations are connected to an ordinary telephone network through the mobile-system control unit. Such a system is described in U.S. Pat. No. 3,663,762 dated May 16, 1972 and Z. C. Fluhr and E. Nussbaum paper of the title "Switching Plan for a Collular Mobile Telephone System" I.E.E.E. Transaction on Communications, Vol. COM-21, Nov. 1973. The reason for using a common control channel in this system is to improve the control efficiency and the efficiency of utilization of the speech channels by commonly controlling a plurality of speech channels at a high speed where a mobile communication service is contemplated in a high capacity and over a wide area.

However, the prior art system is accompanied by a number of problems so that its reliability is not yet sufficiently high as will be described hereunder.

More particularly, the mobile-system base stations, the mobile-system control unit and the mobile-system exchange unit are interconnected by a four line speech channels and a control channel common to respective speech channels, and the information for controlling the processing of origination and paging are transmitted through a common control line or channel. Moreover, the information transmitted through the common control line is in the form of digital information. Although digital information is efficient for high speed and high density transmissions it is liable to be affected by noise. For this reason, where digital information is used, it is usual to use an expensive and complicated check circuit in order to assure extremely high accuracies. The use of such check circuit, however results in the complication of the system control and in the increase in the cost of installation. Furthermore, where the information regarding the state of the radio channel of each speech channel is to be transmitted continuously, sending this information over a common control channel may be difficult due to the large volume of information which must be sent to represent the constantly changing state of the radio channel.

In addition, since the radio telephone system utilizes wireless waves as the information transmission medium, it involves various problems specific to radio transmission. Firstly, due to decrease in the transmission characteristics caused by fading phenomena control information sent to or received from mobile vehicles will not be transmitted accurately, or when a speech channel is available between a mobile vehicle and a mobile-system base station it will be difficult to maintain desired speech quality. In addition, under these conditions, an electric wave utilized in another radio zone may enter into an idle speech channel or may cause interference with waves of the adjacent zones.

The state of the radio channel for each speech channel is represented by the presence of an electric wave which indicates whether the channel is available or not, and the mobile-system base stations, mobile-system control unit and mobile-system exchange unit are required to acknowledge such information. In view of the large volume of information required to represent the constantly changing state of the speech channels, however, it is impossible to transmit such information over the common control channel. However, the provision of control lines for transmitting digital signals corresponding to respective speech channels increases the size and cost of installation.

Due to these problems, among various operations of the system, selection of an idle speech channel is most severely affected. Generally, to select an idle speech channel, an idle speech channel memory device (or a temporary memory device) adapted to store an idle or busy state of the speech channel is provided for finding an idle speech channel out of a plurality of speech channels where a request for origination or paging is made. In the prior art system, it is impossible to change the channel content of the idle speech channel memory device except a case wherein the channel content is changed to a blocked state for the purpose of designating a new channel and a case wherein the channel content is changed to idle state when the speech of a given channel is terminated.

For this reason, where the channel content has been changed by an erroneous control data, even when the controller of the mobile-system control unit designates a speech channel based on the content of the idle speech channel memory device it may happen to designate a busy speech channel or to fail to designate a channel when the channel content is blocked irrespective of the fact that it is actually in an idle state. When an actually idle speech channel is designated under a poor wave transmission condition, it would be impossible to maintain the desired speech quality. Where the wave transmission condition becomes poor during speech and irrespective of the fact that the speech has already been terminated the speech channel might be continuously disabled when the mobile control unit fails to detect termination of the speech. Under these conditions, the mobile vehicle and the mobile base station continue to radiate electric waves.

Another problem is that the reliability of all speech channels of a given mobile base station would be decreased when there is some transmission trouble, for example noise, wire breakage, etc., occurs on the common control channel.

Still another problem is that when it becomes impossible to generate control digital data due to a system trouble of the radio mobile control unit, control of the transmitter of the mobile-system base station becomes completely impossible.

SUMMARY OF THE INVENTION

Accordingly, the principal object of this invention is to provide a novel control system of radio channels of a mobile radio telephone system which can always supervize the state of the radio speech channels thereby maintaining high speech qualities.

Another object of this invention is to provide a highly reliable control system for radio channels of a mobile radio telephone system which does not select an idle speech channel if there is a wave interference in that channel and which can prevent radiation of useless wave from a transmitter associated with an idle speech channel which might otherwise cause mutual interference of the electric waves.

Still another object of this invention is to provide a control system of radio channels of a mobile radio telephone system capable of preventing continuous disablement of a speech channel irrespective of the fact that the speech of that channel has already been terminated thereby increasing the reliability of the speech channels.

A further object of this invention is to provide a control system of radio channels of a mobile radio telephone system capable of restoring the mobile-system base station to a normal operating condition when a system trouble occurs in the mobile-system control unit during speech.

Still another object of this invention is to provide a control system of radio channels of a mobile telephone system capable of eliminating a mismatch condition even when the content of the speech channel memory device and the state of a speech channel become mismatched due to a system trouble such as a fault in the sequence controller.

Yet another object of this invention is to provide a control system of the radio channels of a mobile radio telephone system.

According to this invention these and further objects can be accomplished by providing a radio channel control system for a mobile radio telephone system of the type wherein the service area of the system is divided into a plurality of radio zones, mobile-system base stations are installed in respective radio zones, each mobile-system base station is connected to a mobile-system control unit through a control channel and a plurality of speech channels, and the mobile control unit is connected to an ordinary telephone network, wherein said radio channel control system comprises a plurality of signal lines extending between the mobile-system base stations and the mobile-system control unit and combined with respective speech channels.

The signal lines are used to display the states of the speech channels or to transmit control informations for remotely controlling the mobile-system base stations. It is possible to accurately determine the state of the speech channel from the signals obtained by the signal lines. Accordingly it is possible to change the content of the idle speech channel memory device by these signals.

According to another embodiment of this invention these signal lines are used to control transmission and termination of the electric waves from radio transmitters provided for respective mobile-system base stations, such control being effected by a signal sent from the mobile-system control unit. When system troubles occur in the mobile-system control unit, it is possible to interrupt the source of the transmitter in each mobile base station by using the signal line. This is advantageous where the mobile-system base station is automated or located at a remote position.

According to another embodiment where a speech channel is busy or radiating an electric wave, a on signal is sent through the signal line whereas when the speech channel is idle that is in an available state the signal line is released to be off. For this reason, information transmitted through the signal line or relatively free from noise.

BRIEF DESCRIPTION OF THE DRAWINGS

The details of the organization and the operation as well as further objects and advantages of the invention can be more fully understood from the following detailed description taken in conjunction with the accompanying drawings in which:

FIG. 3 is a block diagram showing the basic construction of a mobile-system base station incorporated with the control system of this invention;

FIG. 4 is a block diagram showing one example of the speech channel receiver and the up path speech channel state detector shown in FIG. 3;

FIG. 5 is a block diagram showing one example of the speech channel transmitter and the down path channel state detector shown in FIG. 3;

FIG. 6 is a block diagram shown the basic construction of a mobile-system control unit incorporated with the control system of this invention;

FIGS. 7A through 7D are charts showing various information useful to explain the sequence of the origination processing operation shown in FIG. 6;

FIGS. 8 and 8A through 8D are flow charts showing the origination processing sequence of the mobile-system control unit and the mobile-system exchange unit shown in FIG. 6;

FIGS. 9A through 9D are charts showing various information useful to explain the paging processing sequence shown in FIG. 6;

FIGS. 10A and 10B are block diagrams showing one example of the speech path unit (SPU) and the peripheral circuits thereof shown in FIG. 6;

FIG. 12 is a flow chart showing the speech termination processing sequence of the mobile-system control unit.

DESCRIPTION OF THE PREFERRED EMBODIMENT

The basic construction of a mobile radio telephone system to which the control system of this invention is applicable will first be described.

The Principle of the System

Figure 1:
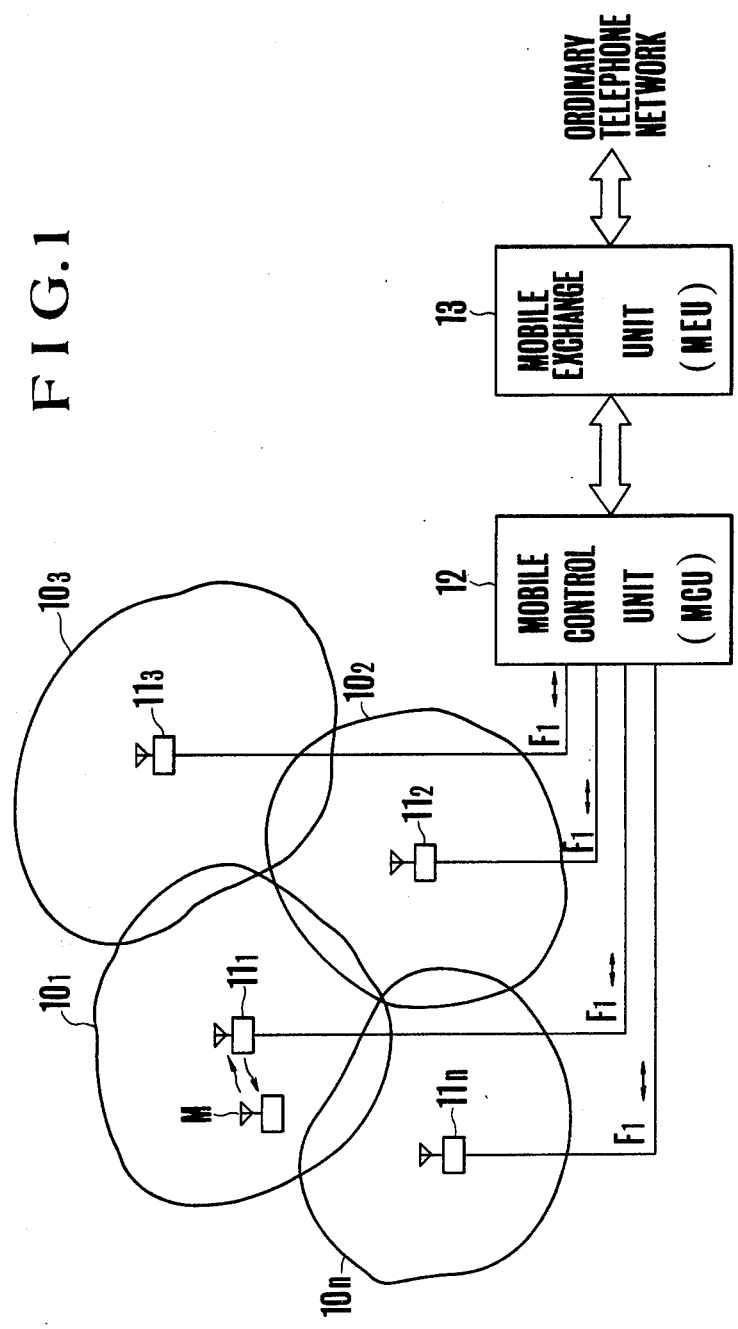
FIG. 1 is a block diagram useful to explain the principle of a mobile radio telephone system to which the control system of this invention is applicable.

In the mobile radio telephone system shown in FIG. 1, the service area of the system is divided into n radio zones $10_1$ through $10_n$ (where n is an integer) and mobile-system base stations (hereinbelow sometimes referred to as mobile base stations) $11_1$ through $11_n$ are installed in respective radio zones. Each zone has a radius of about 5 km, for example. In this example the number of the radio zones is four. Speech channels $f_{i1}$–$f_{im}$ (where m is an integer) are assigned to the nth mobile base station $11_i$ (where i=1−n). These mobile base stations $11_1$–$11_n$ are commonly controlled by a mobile-system control unit (hereinbelow sometimes referred to as mobile control unit) 12. M represents a vehicle, shown in the radio zone $10_l$ in this example.

The basic operation of this system will be described briefly with reference to FIG. 1. When the vehicle M originates, it transmits an origination signal via a control channel $F_l$ and the radiated origination signal is received by all nearby mobile base stations $11_l$ through $11_n$ because the control channel $F_l$ is common to all mobile base stations. Each of the mobile base station adds to the received signal, a signal corresponding to the intensity of the received wave and then sends the resulting sum signal to the mobile control unit 12. This control unit 12 is normally in a condition for waiting for the origination signal so that when it receives the origination signal from the vehicle it determines one of the mobile base stations which sends the strongest signal and then searches for an idle speech channel of said one station. When there is an idle speech channel, said one mobile base station transmits information regarding the idle speech channel to all other mobile base stations $11_l$ through $11_n$ through the control channel $F_1$.

When the vehicle receives a signal regarding the designation of the idle speech channel the vehicle M is switched to channel $f_{11}$.

The mobile-system exchange unit (hereinbelow sometimes referred to as mobile exchange unit) 13 is constructed to establish a connection between the calling and the called party as well as a connection from the vehicle M through the mobile exchange unit to an ordinary telephone network in response to the origination from the vehicle.

Figure 2:
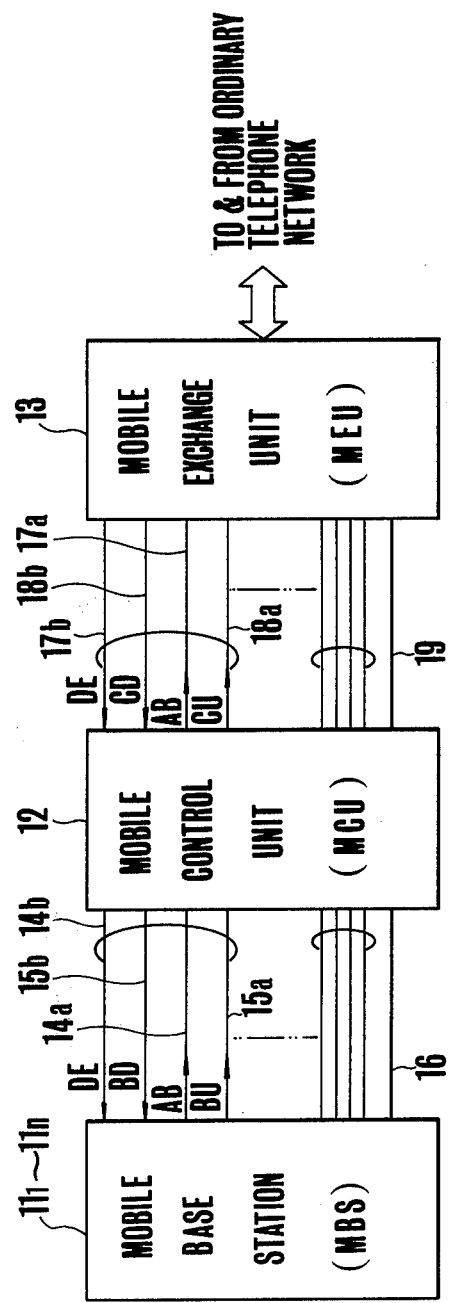
FIG. 2 is a block diagram showing the application of this invention to the mobile radio telephone system shown in FIG. 1.

According to this invention, signal lines, (for example, one up path and one down path) are provided for each one of the speech channels extending between respective mobile base stations and the mobile control unit 12. The telephone system of this type is generally provided with four lines in each of the speech channels (two up path, two down path) and two common control channels, these channels constituting a basic unit, so that one signal line is added to each of the up and down path speech channels. In FIG. 2, each two up and down path speech channels are grouped and shown as an AB up path speech channel $14_a$ and a DE down path speech channel $14_b$ whereas a BU up path signal line $15_a$ and a BD down path signal line $15_b$ are shown independently. Regarding the common control channel, both of the up and down path control channels are grouped and shown by a single thick line 16. In this example, an up path speech channel $17_a$(AB), a down path speech channel $17_b$(DE), an up path signal line $18_a$(CU) and a down path signal line $18_b$(CD) are also provided between the mobile control unit 12 and the mobile exchange unit 13.

In this manner, by providing signal lines corresponding to respective speech channels and independent of the common control channel between the mobile base station and the mobile control unit and between the mobile control unit and the mobile exchange unit it becomes possible to transmit information representing the status of the speech channels and control information for remotely controlling the mobile base stations via these signal lines thus enabling more precise control. Since these signal lines correspond to respective speech channels, it is possible to manually control the mobile base stations when system troubles occur in the mobile control unit 12 or the control channel becomes out or order. As a consequence, it is possible to control the speech termination at the time of fault of the mobile control unit or the data channel thus minimizing the poor or adverse effect of the interference to the speech. As a consequence, the reliability of the system can be greatly improved.

With this arrangement, since the signal lines represent the actual state of the radio speech lines, even when the content of the idle speech channel memory device of the mobile control unit is damaged or system troubles occur, it is possible to reconstruct the content in accordance with the state of the signal line. Accordingly, it is not necessary to install the idle speech channel memory device in duplicate, thus decreasing the chance of troubles of the speech channel control.

The detail of each unit will be described hereunder to make clear the feature of this invention.

Mobile Base Stations $11_l$–$11_n$

Since all mobile base stations have the same construction, the detail of the mobile base station $11_l$ is shown in FIG. 3 as a representative. As shown, the mobile base station $11_l$ is equipped with an antenna 20 for communicating electric wave between it and the vehicle M. The antenna 20 is connected to a speech channel transmitter 23, a speech channel receiver 24, a control channel transmitter 25 and a control channel receiver 26 respectively through a RF multiplexer 21. The speech channel transmitter and receiver 23 and 24 are connected, via a MBS controller 28, to the down path speech channel $14_a$(DE) and the up path speech channel $14_b$ (AB) which are extending between the MBS controller and the mobile control unit 12. The control channel transmitter and receiver 25 and 26 are connected via the MBS controller 28, to down and up path control channels $16_a$ and $16_b$ extending between the MBS controller 28 and the mobile control unit 12. The MBS controller 28 has an operational function which stands for a buffer and a repeater etc.

To the output of the speech channel receiver 24 is connected an up path speech channel state detector 35 which detects the state of the up path speech channel $14_a$ and the output of the detector 35 is connected to the mobile control unit 12 via the up path signal line $15_a$.

To the input of the speech channel transmitter 23 is connected a down path speech channel controller 38 which is connected to receive, via the MBS controller 28, a signal from a down path signal line $15_b$(BD) connected to the mobile control unit 12, thereby controlling the operation of the transmitter 23 in accordance with the received signal.

The mobile base station $11_l$ constructed as above described, converts control data information received from the vehicle M into information suitable for the control of the mobile control unit 12 in a manner to be described later, or to repeat the control data information received from the mobile control unit 12 to the mobile vehicle.

An example of the circuits associated with the signal lines will now be described with reference to FIGS. 4 and 5.

At first, the construction of the speech channel receiver 24 and the up path channel state detector 35 will be described with reference to FIG. 4.

The signal received from the antenna 20 via the RF multiplexer 21 is sent to a RF (radio frequency) amplifier 41 where the signal is connected into an IF (intermediate frequency) signal by the corporation of the high frequency amplifier and a local oscillator 42. The IF signal is amplified by an IF amplifier 43, demodulated by an demodulator 44 and finally sent out to the MBS controller 28. The IF amplifier 43 send a signal to a level detector 46 which provides an output to an integrator 47 when the level of the input exceeds a predetermined level. The output of the integrator 47 is applied to first and second judging units 48 and 49.

The first judging unit 48 produces an output when the integrator 47 produces a continuous output for a predetermined interval $T_1$ of the order of several tens milliseconds. Continuous output of the integrator 47 means that the electric wave from the vehicle M is being continuously received. When the electric wave is interrupted during the speech for a predetermined time, it is judged that the quality of the speech has decreased and the speech channel is released. Furthermore, when the presence of electric wave is detected during a period that the speech channel is not in use, it is judged that there is a wave interference.

The signal repeating operation at the time of receiving and not receiving electric wave is as follows.

The output of the first judging unit 48 is applied to the set terminals S of a flip-flop circuit 50 to set the same. As a consequence its Q output is applied to a relay 51 which produces an output, for example grounded signal, as the output of the up path speech channel state detector 35. This output acting as a signal indicating that the speech channel is suffering a wave interference is sent to the mobile control station 12 via the up path signal line $15_a$ (BU).

The second judging unit 49 produces an output when the output of the integrator 47 is interrupted for a predetermined time $T_2$ of the order of several seconds ($T_2 > T_1$). The interruption of the output from the integrator 47 for a predetermined time means that the speech has terminated or the wave interference has disappeared. The output of the second judging unit 49 is applied to the reset terminal R of the flip-flop circuit 50 to reset the same. Then, the Q output of the flip-flop circuit 50 disappears so that the relay 51 is deenergized.

The reason that the set time $T_1$ of the first judging unit 48 is made to be smaller than the set time $T_2$ of the second judging unit 49 is that the wave presence state is to be rapidly detected with a short time constant whereas the wave absence state should be confirmed with a sufficiently long time constant to render idle the channel so as to assure that the on or off-operation of the up path signal line will not be rendered unstable due to the variation in the level of the received wave. Since the speech channel state detector 35 utilizes integrator 47 as above described, the first and second judging units 48, 49 will not operate immediately even when the state of the speech channel is caused to vary by a noise of short time.

The output of the up path speech channel state detector 35 represents the state of this speech channel. When an on-signal is produced as the output, this speech channel is in a state difficult or impossible to operate due to wave interference. As a consequence, the presence and absence of the on-signal is used to check and confirm the present state of an idle speech channel selected from the idle speech channel memory device where an origination or paging is made in the mobile control unit 12 as will be described later. The on-signal is also used to periodically supervize the content of the idle speech channel memory device and the actual state of the speech channel for the purpose of preventing any mismatch between them. The on-signal is also used as one step of the speech termination operation thereby positively terminating the speech.

One example of the speech channel transmitter 23 and the down path speech channel controller 38 will now be described with reference to FIG. 5.

The voice signal sent from the radio control unit 12 via the down path speech channel $14_b$ and the MBS controller 28 is applied to a modulator 60 of the speech channel transmitter 60. The output of the modulator 60 is sent to the RF multiplexer 21 via a frequency converter 61, a frequency multiplier 62 and a RF amplifier 63 to be radiated through antenna 20. The frequency converter 61 converts the frequency of the output of the modulator 60 in accordance with the output of a local oscillator 64.

The signal sent from the mobile control unit 12 via the down path signal line $14_b$ is sent to a relay 66 of the MBS controller 28 of the down path speech channel controller 38. The signal supplied to relay 66 normally opens it. When the mobile control unit 12 detects the origination from the vehicle 12, a radio zone to be used is selected in accordance with the content of the data. Thus, an idle speech channel of that radio zone is determined so as to send channel information to the mobile exchange unit. At the same time, an on-signal is sent to the down path signal line of the selected idle speech channel. When the relay 66 is energized by the on-signal, it turns on the source of the RF amplifier 63 of the speech channel transmitter 23. Thereafter, the speech channel transmitter 23 is maintained in a state of sending its output to the RF multiplexer 21 by a signal sent from the mobile control unit 12 via the down path speech channel.

Furthermore, the down path speech channel controller 23 turns OFF the source for the RF amplifier 63 of the speech channel transmitter 23 at the termination of the speech. This operation is effected by detecting the disappearance of the on-signal (for example, grounded signal) supplied to relay 66 during speech by a BD off detector 67. When this detector detects the BD-off state it drives an encoder 68 to supply a speech channel release signal to the modulator 60. This release signal is sent to the vehicle M through the speech channel transmitter 23, RF multiplexer 21 and antenna 20 thereby causing the vehicle M to release or open the speech channel. The output of the BD off detector 67 is sent to encoder 68 and a timer or a delay circuit 69 so that after sending the release signal to the mobile vehicle M for about one second, the output of the detector 67 is sent to the RF amplifier 63 of the speech channel transmitter 23, thus turning off the source. Consequently, thereafter the speech channel transmitter 23 would not operate unless a BD on-signal is sent to the down path speech channel controller 38 through the down path signal line $15_b$. The source on command from relay 66 and the source off command from timer 69 cause the RF amplifier 63 to turn on and off its bias source, respectively. Alternatively, the output stage of the RF amplifier 63 is turned on or off under the same condition.

In this manner, it is possible to decrease the mutual interference between the down path speech channels by shutting off the wave transmitted from a mobile base station by energizing the speech channel transmitter 23 only during the speech but deenergizing the transmitter 23 in the absence of the speech.

Mobile Control Unit 12

The basic construction of the mobile control unit 12 is shown in FIG. 6. As shown, speech channels $14_a$, $14_b$ and signal lines 15, $15_b$ connected to the mobile base station (MBS) controller 28 of the mobile base station $11_1$ are respectively connected to a speech path unit (SPU) 71 which forms a portion of the mobile control unit 12. The speech path unit 71 is connected to a mobile exchange unit 13 through speech channels $17_a$, $17_b$. The control channels connected to the MBS controller 28 of the mobile base station $11_1$ are connected to a combined encoder and decoder 74 which contains a modulator and a demodulator (not shown) and constitutes a portion of the mobile control unit 12. The combined encoder and decoder 74 is constructed to send control data to the mobile base station $11_1$ or vice versa under the control of a sequence controller 76. The sequence controller 76 is connected to a sequence memory device 77, an idle speech channel memory device 78 that constitutes a portion of the temporary memory device, a timing circuit 79, a SPU controller 80, a scanner 81 and a sense port 82 through a data bus line 85 and an address bus line 86. Furthermore, the sequence controller 76 is connected to a second combined encoder and decoder 88 (also including a modulator and a demodulator not shown) via the data bus line 85 and the address bus line 86. The combined encoder and decoder 88 is connected to the mobile exchange unit 13 through common control channels $19_a$ and $19_b$ to exchange control data therewith. In addition to the idle speech channel memory device described above, the temporary memory device may comprise a SPU correspondence memory device which stores the corresponding relationship to SPU or a memory device that stores an information regarding the origination of a mobile vehicle, or a timer table memory device. However, as these memory devices are immaterial to this invention their detailed description will not be made herein.

Mobile Exchange Unit 13

Figure 11:
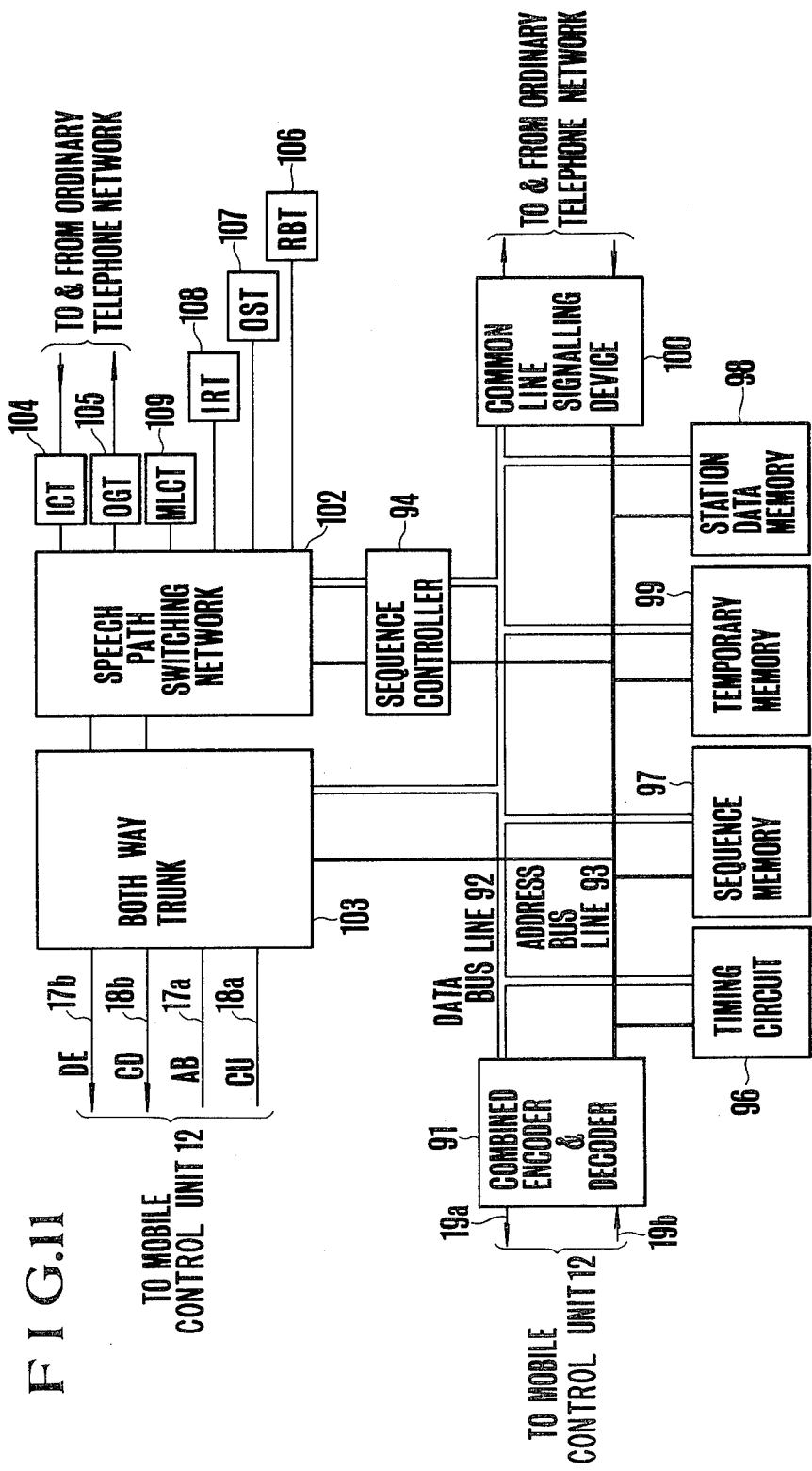
FIG. 11 is a block diagram showin the basic construction of an exchange station embodying the invention.

The basic construction of the mobile exchange unit 13 is shown in FIG. 11. As shown, the mobile exchange unit 13 is connected to the mobile control unit 12 via four up and down path speech channels $17_a$ and $17_b$, two up and down path signal lines 18 and $18_b$ and two up and down path control lines $19_a$ and $19_b$ and provided with apparatus necessary to connect the radio telephone system with an ordinary telephone network.

The common control lines $19_a$ and $19_b$ connected to the combined encoder and decoder 88 of the mobile control unit 12 are connected to a combined encoder and decoder 91 also including a modulator and demodulator, not shown, so as to communicate control data therebetween over the common control lines. The combined encoder and decoder 91 is connected to a sequence controller 94 via a data bus line 92 and an address bus line 93, and the sequence controller 94 is connected to a timing circuit 96, a sequence memory device 97, a station data memory device 98, a temporary memory device 99, and a common line signal device 100 via the data bus line 92 and the address bus line 93. In this case, the temporary memory device 99 is constituted by a paging memory device, a busy memory device and an origination memory device, while the station data memory device 98 is constructed to store stored channel numbers corresponding to respective mobile base stations.

The mobile exchange unit 13 further comprises a speech path switching network 102, a bidirectional or both way trunk 103, an incoming trunk (ICT) 104, an outgoing trunk (OGT) 105, a ring-back tone trunk (RBT) 106, an origination sender trunk (OST) 107, an incoming register trunk (IRT) 108, a mobile loop check trunk (MLCT) 109. These trunks are connected to the sequence controller 94 through bus lines 92 and 93.

The purpose of the common line signal device 100 is to communicate control data with an ordinary telephone network and includes a buffer memory device for storing control data, a memory designator that designates the buffer memory device based on the address information.

The operations of the mobile control unit 12 and the mobile exchange unit 13 at the times of origination and paging are described in detail in the specification of a copending U.S. Patent application Ser. No. 801,022 filed on May 26, 1977 under of a title "Radio Channel Control Systems of Mobile Radio Telephone Systems".

Origination Operations of Mobile Control Unit 12 and Mobile Exchange Unit 13

Normally, the sequence controller 76 is in a waiting state and operates to supervize whether a mobile vehicle M has originated or not, or whether a paging is made from an ordinary telephone network through the common control channel.

When an origination signal as shown in FIG. 7A is received by the control channel receiver 26 of the mobile radio station $11_1$ from a mobile vehicle M, the receiver 26 sends to the combined encoder and decoder 74 of the mobile control unit 12 a control data which is formed by adding the received signal level to the received origination signal and shown in FIG. 7B through control channel 16B. In response to the output of the combined encoder and decoder 74 the sequence controller 76 performs the origination sequence processing as shown in FIG. 8.

When the sequence controller 76 is informed by the output of the combined encoder and decoder 74 of the origination of the vehicle (step 121), a mobile station identification information, a radio zone information, a signal type information and a level information are stored in a temporary memory device, not shown. Then, the mobile base station from which the strongest signal has been received is determined in accordance with various information described above sent from respective mobile base stations (step 122) so as to search whether there is an idle speech channel or not in the speech channels belonging to said mobile base station (step 123). The method of searching is fully described in a copending U.S. Patent application Ser. No. 760,124 filed on Jan. 17, 1977 under a title of "A method of assigning a radio channel to a calling mobile body of a mobile communication system and radio channel assigning therefor" so that the method will not be described in this specification.

In the absence of an idle speech channel, an idle speech channel of a radio zone having the second largest wave level is searched and if search is in vain, the system is returned to the waiting state, and the release processing is performed (step 214). On the other hand, where a idle speech channel is found in step 123, the sequence controller 76 determines whether there is an wave interference or not in the selected idle speech channel by determining whether there is a on-signal or not on the up path signal line $15_a$ and the down path signal line (step 125). If there is an on-signal on these signal lines the sequence controller 76 advances to step 126 for selecting another idle speech channel and executes the sequence of the step 125 on the another idle speech channel. In the absence of any idle speech channel the release processing is performed (step 124).

Where there is no wave interference on the selected idle speech channel, the sequence controller 76 writes the data regarding this idle speech channel in a SPU correspondence memory device, not shown, and then advances to the next step 127 thereby performing a channel designation processing. More particularly, the sequence controller 76 forms a control data, that is a channel designation signal shown in FIG. 7C by combining the information regarding the selected idle speech channel with the identification number information of the vehicle M which has been temporarily stored in the temporary memory device, and sends this control data to the combined encoder and decoder 74 which transmits the control data to the mobile base stations $11_1$ through $11_n$ via the control channel $16_a$.

At the same time, the sequence controller 76 designates a SPU (speech path unit) address corresponding to the selected speech channel and sends the information regarding the designated address to the SPU controller 80 via the address bus line 86. As a consequence, the SPU controller 80 sends an on-signal to the BD down path signal line $15_b$ corresponding to the selected speech channel thereby turning OFF the source of the speech channel transmitter 23 of the mobile base station $11_1$. Then the sequence controller 76 controls the speech path unit 71 via the SPU controller 80 to perform a loop check test of the radio speech channel (step 128). When the result of this loop check test is satisfactory an origination signal having a pattern as shown in FIG. 7D is sent to the mobile exchange unit 13 via the combined encoder and decoder 88. At the same time, the sequence controller 76 controls the speech path unit 71 via the SPU controller 80 for sending an ground signal to the CU up path signal line $18_a$ (step 129). The CU on-signal means that the mobile exchange unit 13 has completed the checking of the designated speech channel. Accordingly, the information sent through the common control channel and the information exchanged between the mobile exchange unit and the mobile control unit through signal lines are doubly checked. Accordingly, the reliability of the control operation when the mobile control unit advances to the next step is improved.

As the mobile exchange unit 13 receives the origination signal from the combined encoder and decoder 91 through the common control line 196 (step 131 shown in FIG. 8A), the sequence controller 94 temporarily stores this data in the temporary memory device 99 and then selects a bidirectional or both way trunk line, and an output trunk line corresponding to the speech channel number information of that data (step 132).

Then the sequence controller 94 operates to check whether there is an on-signal on the up path signal line $18_a$ of the both way trunk or not (step 133) thereby performing the loop check test of the ordinary telephone system. If there is no on-signal, an on-signal is sent to the down path signal line $18_b$ from the both way trunk 103 (step 134).

When the sequence controller 76 of the mobile control unit 12 receives the CD on-signal on the down path signal line $18_b$ (step 136 shown in FIG. 8B), the speech path unit 71 supplies a dial tone sending command signal to the down path speech channel $15_b$ through the SPU controller 80 (step 137).

When a dial signal is sent to the mobile exchange unit 13 from the mobile vehicle M via SPU 71 of the mobile control unit 12 (step 140 shown in FIG. 8C), the sequence controller 94 analyzes the dial signal (step 141) and if the dial is satisfactory it removes the CD on-signal from the down path signal line $18_b$ (step 142). Further, since the mobile control unit 12 receives the release or open signal of the down path signal line $18_b$ from the mobile exchange unit 13 ((step 147 shown in FIG. 8D) it is noted that the dial tone is normal. After repeating the ring back tone to the vehicle M (step 148) the sequence controller 94 performs the outgoing connection processing (step 143) to send a call tone to the called party or subscriber and a ring back tone to the vehicle M (step 143). When the called party responds (step 144), the down path signal line $18_b$ is again applied with a CD on-signal (step 145) thus terminating the origination operation. Thus, when the fact that a CD on-signal has been applied to the down path signal line $18_b$ from the mobile exchange unit 13 is detected, the origination operation is terminated and speech is commenced. This transfer of the steps is effected by using the content of the SPU corresponding memory device.

Paging Operation of the Mobile Control Unit 12 and the Mobile Exchange Unit 13

Where there is a paging, the mobile exchange unit 13 analyzes the paging and thereafter sends a control data as shown in FIG. 9A to the combined encoder and decoder 88 via the common control line $19_a$.

After storing the data concerning the paging in a temporary memory device, not shown, the sequence controller 76 causes all mobile base stations to send control data shown in FIG. 9B via the combined encoder and decoder 74 and the common control line $16_a$ thereby simultaneously calling the mobile vehicles M.

On the other hand, when a paging response is received from the vehicle M the sequence controller 76 executes the steps 121 through 125 among the sequences of the origination operation shown in FIG. 8. Similar to the origination operation, the sequence controller 76 sends to the vehicle M the speech channel disignation data shown in FIG. 9C via the common control channel $16_a$ and the mobile base station so as to send a BD on-signal to the down path signal line $15_b$ thus turning on the source of the transmitter 23 of the mobile base station. Then the sequence controller 76 performs the loop check test of the radio speech channel loop and when the channel is available, it sends a paging response signal of the pattern shown in FIG. 9C to the mobile exchange unit 13 via the common control line $19_b$.

When the sequence controller 94 of the mobile exchange unit 13 receives the paging response signal it catches the both way trunk 103 to connect to the MLCT 109 thereby performing the check test of the speech channel loop of the ordinary telephone system. If the channel loop is available the sequence controller 94 sends a CD on-signal to the down path signal line $18_b$ through the both way trunk 103. Then, the sequence controller 94 sends a call tone to the vehicle and a ring back tone to the originating side.

When the vehicle responds by hooking off, the sequence controller 76 of the mobile control unit 12 applies a CU on-signal to the up path signal line $18_a$.

When the sequence controller 94 of the mobile exchange unit 13 detects this CU on-signal on the up path signal line, speech is commenced.

Speech Termination Operation of the Mobile Control Unit 12 and the Mobile Exchange Unit 13

The speech termination operation of the mobile control unit 12 and the mobile exchange unit 13 will now be described with reference to the flow chart shown in FIG. 12 which shows the operation of the mobile control unit 12.

When a subscriber on the side of the mobile exchange unit 13, that is on the side of the ordinary telephone system firstly hooks on a speech termination is detected on the side of the mobile exchange unit 13. Then the exchange unit 13 performs such predetermined speech termination operation as charge stop and then the sequence controller 94 makes an access to the both way trunk 103 to remove the CD on-signal from the down path signal line $18_b$.

As a consequence, in response to the opening of the down path signal line $18_b$ (step 515), the sequence controller 76 of the mobile control unit 12 causes the SPU 71 to remove the BD on-signal from the down path signal line $15_b$ via the SPU controller 152 (step 152). Consequently, after sending a release signal, the transmitter 23 of the mobile base station $11_1$ turns off the source.

Upon receiving an on hook tone from the vehicle M (step 153), the sequence controller 76 removes the CU on-signal from the up path signal line $18_a$ (step 154) to write an idle state in the SPU correspondence memory device, not shown, thereby displaying the idle state of a corresponding speech channel of the idle speech channel memory device 28 (step 155). At this time, the speech termination operation is completed. Of course, on the side of the mobile exchange unit, a well known speech termination processing such as charging stop is performed.

When the subscriber of the vehicle M firstly hooks on, a speech termination tone is sent from the vehicle M in response to the hook on operation, for example. As the sequence controller 76 receives this speech termination tone via SPU 71 (step 157), it removes the CU on-signal from the up path signal line $18_a$ (step 158) whereby the mobile exchange unit 13 executes such predetermined speech termination sequence as the charge stopping. When supplied with the speech termination signal from the ordinary telephone system the mobile exchange unit 13 removes the CD on-signal from the down path signal line $18_b$.

When the release of the down path signal line $18_b$ is detected (step 159) the sequence controller 76 will cause SPU 71 to remove the BD on-signal from the down path signal line $15_b$ via the SPU controller 81 (step 160). As a consequence, the transmitter of the mobile base station transmits a release signal to turn off the source of the transmitter.

Upon receiving an on hook tone from the vehicle M (step 161) the sequence controller 76 stores the information of the idle speech channel in a corresponding SPU memory device, not shown, thereby causing the corresponding channel of the idle channel memory device 28 to display the idle channel (step 162). At this time, the speech termination operation is completed.

In the foregoing description, the speech termination operation was described mainly with reference to the sequence controller 76 and circuit elements associated therewith. However, there is a case that the sequence controller 76 can not operate due to the interruption of the source caused by a system fault. In such a case, the BD on-signal will not be applied to the down path signal line $15_b$. Under these conditions, when the down path signal line $15_b$ is opened, the transmitter 23 of the mobile base station transmits a release signal thus turning off the source of the transmitter.

Control Operation when the Content of the Idle Speech Channel Memory Device is different from the Actual State of the Speech Channel Since this operation renders the content of the idle speech channel memory device that stores the state of the speech channel to be the same as the actual state of the speech channel, if they do not coincide each other, the content of the idle channel memory device is corrected to become equal to the actual state or an alarm is operated, if desired.

The sequence controller 76 of the mobile control unit 12 shown in FIG. 6 starts a scanner in response to a timing pulse generated by the timing circuit 79. This timing pulse is generated by the timing circuit when a time out or time over occurs during the course of the origination or paging. Alternatively, the timing signal is generated when the origination or paging sequence terminates. The scanner 81 begins its scanning operation when it receives the timing pulse for checking the states of the down path signal line $15_a$ and the up path signal line $18_b$ thereby sequentially sending out these states. The sequence controller 76 compares the output of the scanner 81 with the corresponding channel content of the idle channel memory device 78. If they differ, the sequence controller 76 rewrites the content of the idle speech channel memory device 78 or sends an alarm signal.

Speech Path Unit (SPU) 71 and its Peripheral Circuits

Figure 10B:
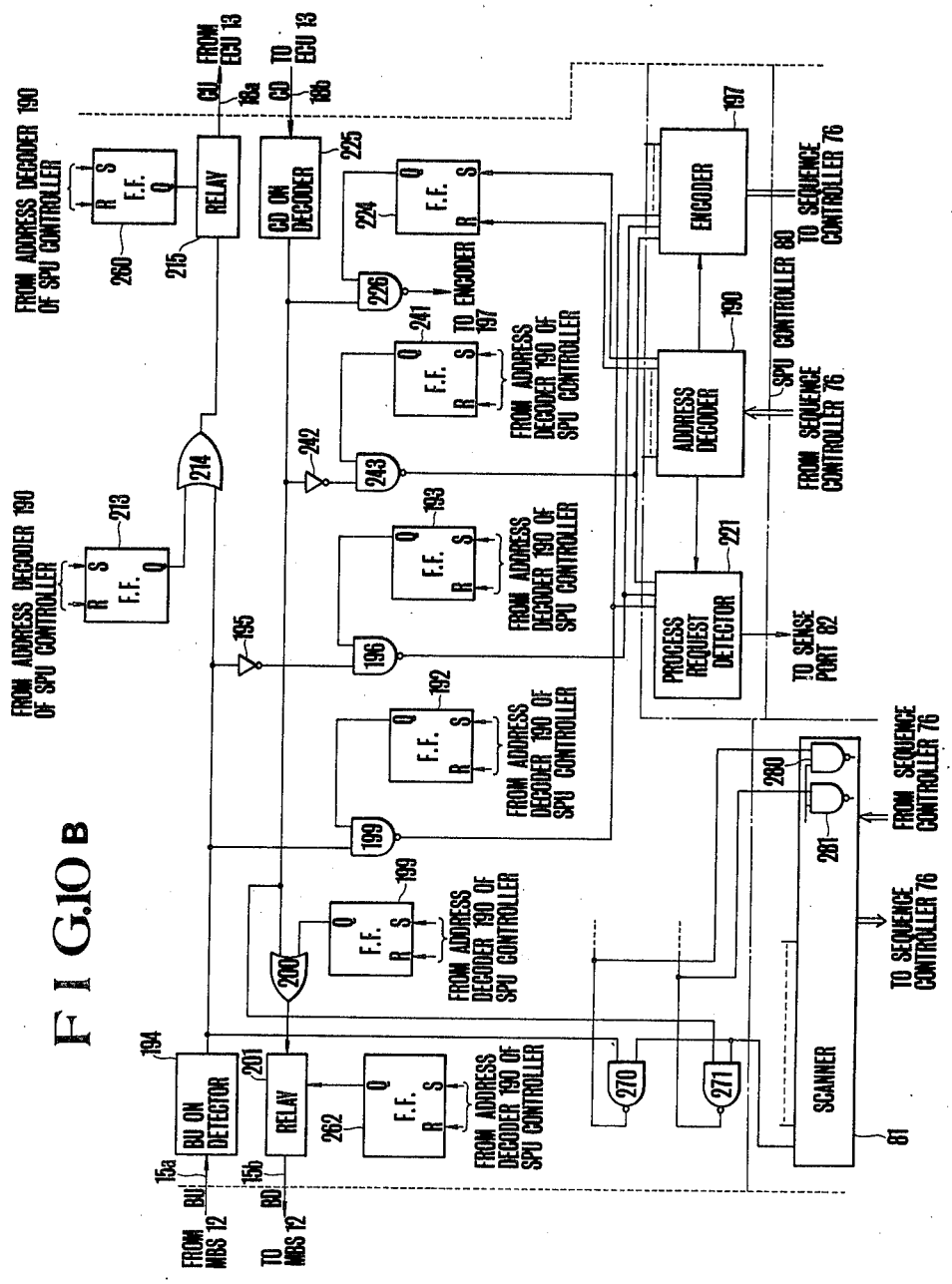

With reference now to FIGS. 10A and 10B the detail of the speech path unit 71 and its peripheral circuits of the radio control unit will be described hereunder. The speech path unit 71 operates to check whether a speech channel has been established or not to the vehicle via the mobile base section 11, to repeat a dial signal from the vehicle M to the mobile exchange unit 13, and to confirm that speech channel has been established between the mobile exchange unit 13 and the ordinary telephone system by utilizing the signal lines provided by this invention.

The relationship between the SPU 71 and the states of respective speech channels is as follows.

To establish an origination connection the sequence controller 76 selects an idle speech channel from the content of the idle speech channel memory device in response to an origination signal from the mobile base station 11. The sequence controller 76 makes an access to the address decoder 190 of the SPU controller 80 for the purpose of checking the actual state of the selected idle speech channel (step 125, shown in FIG. 8) thereby setting flip-flop circuits 192 and 193. If this speech channel is free from any wave interference, BU on detector 194 will not produce any output and an output is produced via an inverter 195 and a NAND gate circuit 196. The output of the NAND gate circuit 196 is derived out through a SPU encoder 197. Under these conditions the sequence controller 76 advances to the succeeding step (step 127 shown in FIG. 8). If the speech channel is subjected to a wave interference, the up path signal line $15_a$ is applied with a BU on-signal so that the output of the BU on detector 194 would be derived out through the NAND gate circuit 198. At this time, the sequence controller 76 selects another idle speech channel, and operates an alarm, if desired. When the sequence controller 76 judges that the idle speech channel is free from any wave interference, a control data information shown in FIG. 7C is sent to the vehicle M via the mobile base station 11 (step 127 shown in FIG. 8). At the same time, the sequence controller 76 commonds to apply a BD on-signal to the down path signal line $15_b$ corresponding to the idle speech channel. This command is sent to the address decoder 190 of the SPU controller 80 and the output thereof sets a flip-flop circuit 199 and energizes a relay 201 via an OR gate circuit 201 thereby turning on the down path signal line $15_b$. By applying a BU on-signal to this signal line, the source of the transmitter 23 of the mobile base station 11 is turned on.

The sequence controller 76 advances to the step 128 shown in FIG. 8 so as to set a flip-flop circuit 202 concurrently with the operation described above, thus opening a gate circuit 203. At this time, the sequence controller 76 sets a flip-flop circuit 204 to prepare to receive a signal showing that the radio speech channel loop is available via the gate circuit 203, a receiver 204 and a NAND gate circuit 205. Then the sequence controller 76 sends to the address decoder 190 of the SPU controller 80 to cause it to produce a signal for confirming the presence of a speech channel loop. This signal is decoded by the address decoder 190 and then utilized to set a flip-flop circuit 206 for opening a gate circuit 207 thus sending a loop confirmation tone to the down path speech channel $14_b$ from an oscillator 208. In the mobile base station 11, this loop confirmation tone is modulated and then transmitted to the vehicle M.

When the receiver 204 receives a loop confirmation response tone from the vehicle, this tone is sent to the encoder 197 and the process request detector 211 of the SPU controller 80. The output of the process request detector 211 is sent to the sequence controller 76 via a sense port 82. Accordingly, the sequence controller 76 sends an address data to the SPU controller 80 for confirming that there is a loop confirmation response by analyzing the content of the encoder 210.

When the loop confirmation response is made the sequence controller 76 advances to step 129 shown in FIG. 8 for transmitting the data regarding the origination to the mboile control unit 13 via the combined encoder and decoder 88. This data has a construction as shown in FIG. 7D. Concurrently therewith, the sequence controller 76 sets a flip-flop circuit 213 via the address decoder 196 to energize a relay 215 via an OR gate circuit 214 thereby applying a CU on-signal to the up path signal line $18_a$ connected to the mobile exchange unit 13.

Concurrently with the operations described above, since the sequence controller 76 receives a speech channel loop check test tone between it and the mobile exchange unit 13, it sets a flip-flop circuit 217. Also the flip-flop circuits 204 and 206 utilized for the loop confirmation test to the vehicle M are set.

When a well known origination processing is performed in the mobile exchange unit 13 an ordinary telephone loop confirmation signal is transmitted to the down path speech channel via the both way trunk 103 (step 134, shown in FIG. 8A). When the receiver 218 receives this loop confirmation signal, it sends its output to the encoder 197 and the process request detector 211 of the SPU controller 80 via an NAND gate circuit 219. As the sequence controller 76 receives the output of the process request detector 211 via the sense pole 82, it sets a flip-flop circuit 220 to send an ordinary telephone system loop confirmation response tone to the up path speech channel $17_a$ from oscillator 221 via a gate circuit 222. At the same time, a flip-flop circuit 224 is set by the output of the address decoder 190 thus preparing to receive the CD on detection signal of the down path signal line $18_b$ which is sent from the mobile exchange unit 13 in accordance with the ordinary telephone system loop confirmation response tone, by the CD on detector 225 via a NAND gate circuit 226.

When the ground signal of the down path signal line $18_b$ is detected by the CD on detector 225 of the down path signal line (step 136 of FIG. 8B), the output of this detector 225 is sent to the encoder 197 and the process request detector 211 via NAND gate circuit 226. In response to the output of the encoder 197 for the sense port 82 and the SPU controller 80, the sequence controller 76 analyzes the data and when it judges that a speech channel loop of an ordinary telephone system is available, it resets flip-flop circuits 220 and 217.

Figure 8B:
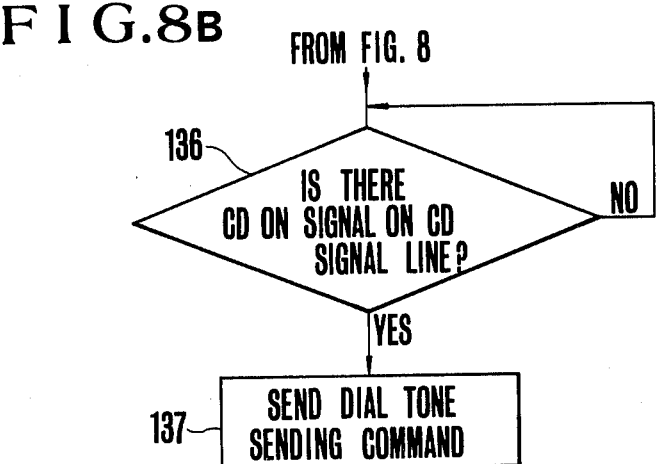
Figure 8D:
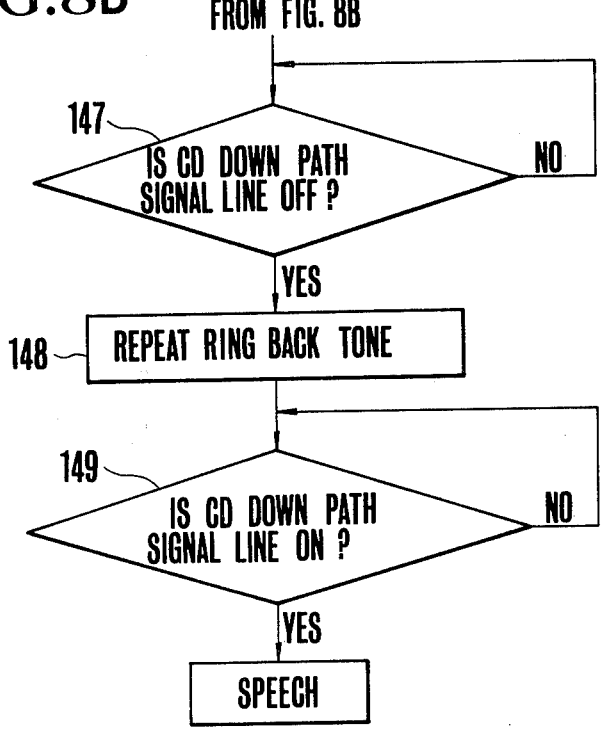

Then, the sequence controller 76 sets a flip-flop circuit 230 via the address decoder 190 of the SPU controller 80 thereby sending a tone signal that commands the transmission of a dial tone to the down path speech channel $14_b$ from the oscillator 231 via the gate circuit 232 (step 137, shown in FIG. 8B). At the same time, flip-flop circuit 238 is also set to establish a speech channel to the mobile exchange unit 13.

Also the flip-flop circuit 241 is set to enable to detect whether the down path signal line $18_b$ has been released or not via the CD on detector 225, inverter 242 and NAND gate circuit 243.

The dial tone from the vehicle M is sent to the mobile exchange unit 13 via the SPU 71 (step 140, shown in FIG. 8C) for checking that whether the dial tone has been correctly received by the mobile exchange unit 13 or not (step 141 shown in FIG. 8C). If the dial tone was correctly received the sequence controller 94 of the mobile exchange unit 13 removes the DE on-signal from the down path signal line $14_b$ through the both way trunk 103 (step 142 shown in FIG. 8C). If the dial tone is not correct at this time, this fact is transmitted to the mobile control unit 12 from the mobile exchange unit 13 through the combined encoder and decoder 91, thus executing an release processing.

When the release of the down path signal line $18_b$ is detected by the detector 225, this fact is transmitted to the encoder 197 and process request detector 211 of the SPU controller 80 via inverter 242 and NAND gate circuit 243, and the output of the detector 211 is sent to the sense port 82.

When the sequence controller 76 confirms the release of the down path signal line $18_b$, flip-flop circuits 230 and 241 are reset for generating a tone signal that commands the sending of a dial tone.

When the called subscriber responds (step 144 shown in FIG. 8C) the sequence controller 94 of the mobile exchange unit 13 again applies a CD on-signal to the down path signal line $18_b$ through the body way trunk 103 thereby putting the SPU in the speech state.

When the sequence controller 76 controls via inverter 242, NAND gate circuit 243, adapted to detect the speech termination tone from the vehicle and NAND gate circuit 243 via inverter 242 so as to detect the release of the down path signal line 18$_b$ extending from the mobile exchange unit 13, at the time of speech termination on the paging side.

The paging connection operation of the SPU 71 will now be described.

When the mobile control unit 12 is informed of the paging from the mobile exchange unit 13 through the common control line 19$_a$, it sends a paging information to the mobile base stations 11 via the common control line 16$_a$ thereby radiating electric waves from the antenna 20 of all mobile base stations 11.

When a response signal from the mobile vehicle M is detected, a radio zone is selected in the same manner as the origination connection described above for selecting an idle speech channel from the idle speech channel memory device, and the presence or absence of a wave interference of the selected idle speech channel is confirmed through the up path signal line 15$_a$. In the same manner as the origination connection operation, when the idle speech channel is selected, the sequence controller 76 sets the flip-flop circuits 192 and 193 via the address decoder 190 of the SPU controller 80 thereby judging the presence or absence of the interference in accordance with the outputs produced at that time by the NAND gate circuits 199 and 196.

When the absence of the wave interference of the selected idle speech channel is confirmed, the sequence controller 76 sends a paging response signal to the mobile exchange unit 13 via the common control line. At the same time, the flip-flop circuit 224 for detecting the CD on-signal on the down path signal line 18$_b$ is set.

In response to the above described control data, the mobile exchange unit 13 selects a speech channel and applies a CD on-signal to the down path signal line 18$_b$. When the sequence controller 76 confirms the application of the CD on-signal to the signal line 18$_b$, it sends an information shown in FIG. 9C and containing a speech channel number to the vehicle M from the mobile base station via the common control line.

Thereafter, the operations between the vehicle M and the mobile control unit 12 are performed in the same manner as the above described operations for the origination connection until the BD on-signal is applied to the down path signal line 15$_b$ thereby performing the confirmation test of the radio speech channel loop.

When the receiver 204 of SPU 71 receives a radio side loop confirmation response signal its output is sent to the sense port 82 via NAND gate circuit 205, the encoder 197 and the process request detection circuit 211 of the SPU controller 80. When the sequence controller 76 confirms the establishment of the radio side loop it sets the flip-flop circuit 230 via the address decoder 190 thereby sending a call tone sending command signal for the vehicle M to the down path speech channel 14$_b$ from the oscillator 231 via the gate circuit 232. At the same time, the flip-flop circuit 251 is set via the address decoder 190 so as to receive the response tone from the vehicle M by the receiver 252 via NAND gate circuit 253.

When the handset of the vehicle M is hooked off to produce a response tone, this tone is received by the receiver 252 and then sent to the sense port 82 via the encoder 197 and the process request detection circuit 211 of the SPU controller 80. When the sequence controller 76 confirms the vehicle response by the output of the receiver 252, the flip-flop circuit 230 is set via the address decoder 190. At the same time, the flip-flop circuit 213 is set via the address decoder 190 to apply a CU on-signal to the up path signal line 18$_a$ by energizing relay 215. This informs to the mobile exchange unit 13 the fact that the vehicle M has responded, and the speech state is established. Then, the flip-flop circuit 241 is set to enable the speech termination tone detection NAND gate circuit 246 and the NAND gate circuit 243 adapted to detect the release of the down path signal line 18$_b$ their terminating the paging processing.

The speech termination operation of SPU 71 is as follows.

Assume now that the handset of the vehicle M is hooked on the speech termination tone is firstly sent. During the speech state, flip-flop circuits 202 and 238 are set and the flip-flop circuit 249 is also set. Under these conditions, when the receiver 245 detects the speech termination tone the output of the receiver is sent to the sense port 82 via the NAND gate circuit 246, encoder 197 and process request detector 211.

Thus, when the sense port 82 confirms the receival of the speech termination tone the flip-flop circuit 260 is set to deenergize relay 215 thus removing the CU on-signal from the up path signal line 18$_a$. Concurrently therewith, the flip-flop circuit 241 is set to enable the NAND gate circuit 243 adapted to detect the release of the signal line 18$_a$.

When the down path signal line 18$_b$ is released, the mobile exchange unit 13 executes a predetermined speech termination processing (for example, charging stop) and thereafter the sequence controller 94 removes the CD on-signal from the down path signal line 18$_b$ via the both way trunk 103.

When the CD on detector 225 of the mobile control unit 12 detects the release of the signal line via inverter 242 and NAND gate circuit 243 the sequence controller 76 sets the flip-flop circuit 264 via the address decoder 190 thus removing the BU on-signal from the down path signal line 15$_b$. At the same time, the NAND gate circuit 253 adapted to derive out the output of the interruption tone receiver 252 is enabled by setting the flip-flop circuit 251.

Upon detection of the interruption of the BD descending signal line 15$_b$, the mobile base station sends an interruption signal to the vehicle M. In this manner, the OFF control operation of the transmitter 23 of the mobile base station 11 is performed.

When the receiver 252 confirms that the vehicle has sent the on hook tone in response to the release signal, its output is sent to the sense port 82 via the NAND gate circuit 253, encoder 197 and the process request detection circuit 221 of the SPU controller 80. Thus, when the sequence controller 76 confirms the on hook tone it resets the flip-flop circuit 251 via the address decoder 190 to erase the content of the idle speech channel memory circuit thereby terminating the speech termination operation.

Now a case wherein the ordinary telephone system side terminates speech prior to the vehicle will be described. When the sequence controller 94 of the mobile exchange unit 13 confirms the speed termination on the ordinary telephone system side in a manner well known in the art, the sequence controller 94 stops charging and the removes the CD on-signal from the down path signal line 18$_b$ via the both way trunk 103.

Accordingly, the NAND gate circuit 243 is enabled through the CD on detector 225 and inverter 242 of the SPU 71 to detect the release of the down path signal line 18$_b$. When the sequence controller 76 confirms this via the encoder 97 and the sense port 82, the flip-flop circuit 262 is set via the address decoder 190 thus removing the BD on-signal from the down path signal line 15$_b$. Concurrently therewith, the flip-flop circuit 251 is set to enable the NAND gate circuit 253 of the on hook tone receiver 252.

Since the BD on-signal has been removed from the down path signal line 15$_b$ the mobile base station 11 transmits an interruption signal to the vehicle M. Accordingly, the vehicle M performs the release operation and the on hook signal is sent to the mobile base station 11, and this signal is detected by the on hook tone receiver 252 of the SPU 71. When the sequence controller 76 confirms this it sets the flip-flop circuit 760 whereby the relay 215 is deenergized to remove the CU on-signal from the up path signal line 18$_a$. At the same time, the corresponding memory of the idle channel speech channel memory device is erased thus terminating the speech termination operation.

To normally supervise the idle speech channel NAND gate circuits 270 and 271 are utilized. One input of the NAND gate circuit 270 is connected to the output of the BU on detector 194 for supervising the state of the speech channel on the radio side, whereas one input of the NAND gate circuit 271 is connected to the output of the CD on detector 225 for supervising the state of the speech channel of the ordinary telephone system side. The other inputs of these NAND gate circuit are connected to receive the scanning signal from the scanner 81. The combination of these NAND gate circuits is provided for each speech channel, and the outputs of all NAND gate circuits are commonly applied to one input of a NAND gate circuit 280 for scanner 281. Similarly, the outputs of all NAND gate circuits 271 are commonly applied to one input of a NAND gate circuit 281 for the scanner 81.

When the scanner 81 receives a timing pulse from the sequence controller 76 due to time over of the sequence, a scanning signal is applied to these NAND gate circuits 270 and 271. When an on-signal is applied to the up and down path signal lines 15$_a$ and 18$_b$, these NAND gate circuits 270 and 271 produce outputs. On the contrary, when the on-signal is not applied to the up and down path signal lines 15$_a$ and 18$_b$, these NAND gate circuits do not produce any output. The outputs of the NAND gate circuits are sent out, on the time division basis, from the scanner via the NAND gate circuits 280 and 281 associated therewith.

The sequence controller 76 compares the output of the scanner 81 with the corresponding content of the idle speech channel memory device. When coincidence is obtained, the sequence controller 76 does not perform any function. However, when a coincidence is not obtained the content of the idle speech channel memory device is renewed in accordance with the data provided by the scanner 81. When the content is rewritten, the sequence controller 76 sends an alarm signal to a panel board, not shown, or sends a signal to an output device, not shown, to show that the content has been rewritten.

The operation described above is performed for all other speech channels.

Bidirectional Trunk 103

One example of the both way trunk 103 which is utilized when the up path signal line 18$_a$ and the down path signal line 18$_b$ are provided in accordance with this invention will be described with reference to FIG. 13, in which only elements directly related to this invention are shown.

Figure 13:
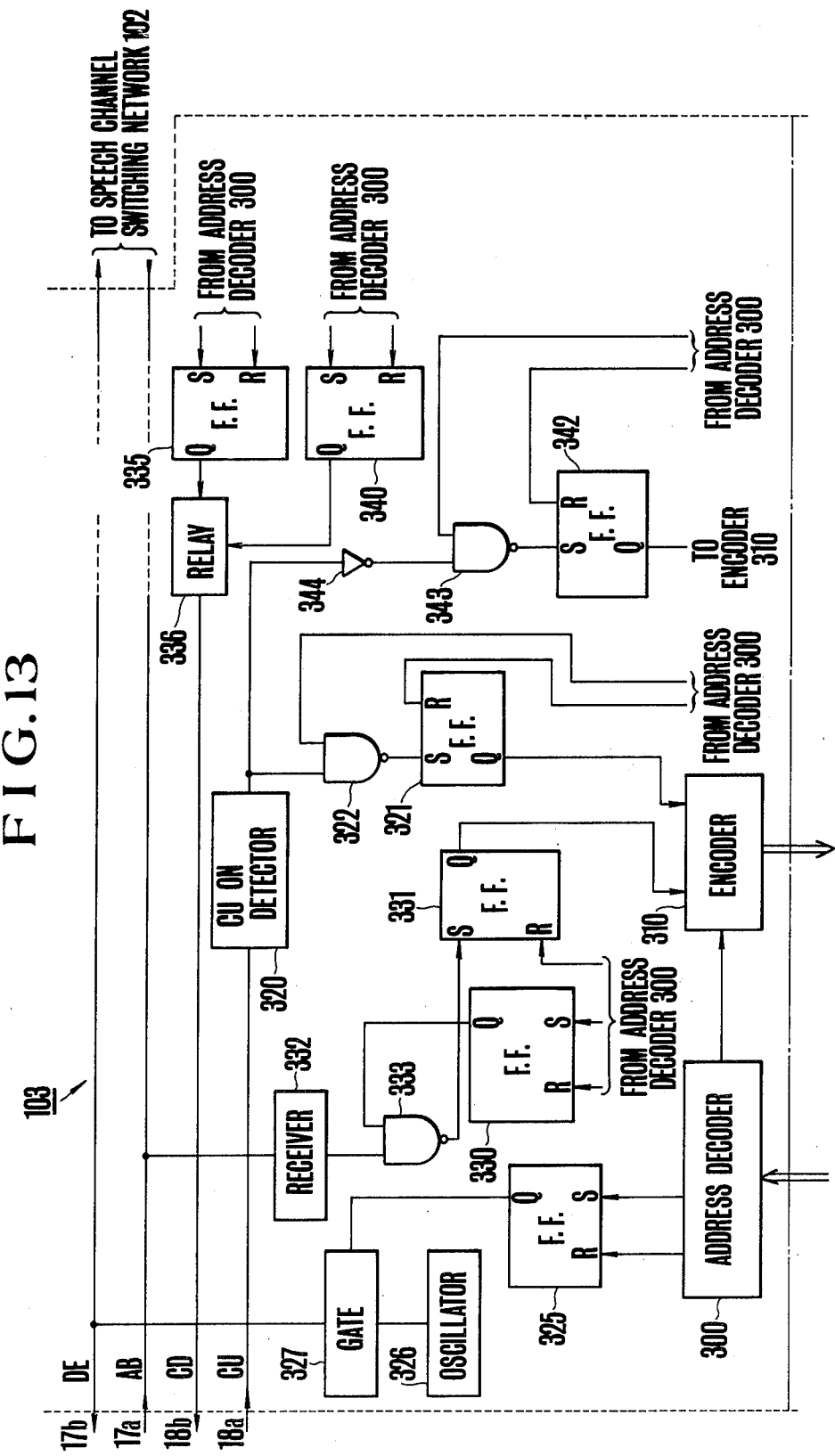
FIG. 13 is a block diagram showing one example of the parts of a bidirectional or both way trunk which are related to this invention.

The both way trunk 103 shown in FIG. 13 comprises an address decoder 300 controlled by the sequence controller 94 via the address bus line and an encoder 310 which provides an output to the data bus line from the both way trunk 103. The origination operation will firstly be described. A CU on-signal applied to the up path signal line 18$_a$ after completion of the radio side speech channel loop check test performed on the side of the mobile control unit 12 is detected by a CU on detector 320 of the both way trunk 103. At this time, the address coder 300 resets the flip-flop circuit 321 under the control of the sequence controller 94 whereas a gate signal is sent to the NAND gate circuit 322. Consequently, when the CU on-signal is detected by the CU on detector 320, the flip-flop circuit 321 is set via the NAND gate circuit 322 and its output is sent out via the encoder 310. In response to this output and the control data sent from the mobile control unit 12 through the common control line 19$_b$ the sequence controller 94 executes a predetermined origination processing sequence.

When the above described origination or paging processing sequence terminates the sequence controller 94 sets the flip-flop circuit 325 via the address decoder 300 so as to send an output to the down path signal line 17$_b$ from the oscillator 325 via the gate circuit 327 thus performing the loop check test of the ordinary telephone system side speech channel. At the same time, the flip-flop circuit 330 is set and the flip-flop circuit 331 is reset. On the other hand, when a response signal is sent to the up path speech channel 17$_a$ from the SPU 71 of the mobile control unit 12, this response signal is received by a receiver 332 of the both way trunk 103. Accordingly, the output of the receiver 332 is applied to an encoder 310 via NAND gate circuit 333 and a flip-flop circuit 331. From the output of this encoder the sequence controller 94 judges that the result of the speech channel loop check test is satisfactory and sets a flip-flop circuit 335 through an address decoder 350. Thus, relay 336 is energized for applying a CD on-signal to the down path signal line 18$_b$. At this time, flip-flop circuits 325 and 330 are set.

Thereafter, when a dial tone sent to the both way trunk 103 through the up path speech channel 17$_a$ is normal, the sequence controller 94 operates to set a flip-flop circuit 340 via the address decoder 300 to deenergize relay 336 which has been energized up to this time for removing the CD on-signal from the down path signal line 18$_b$. Then the flip-flop circuit 335 is reset.

When the sequence controller 94 knows that the called party has responded it sets again the flip-flop circuit 335 and resets the flip-flop circuit 340 via the address decoder 300 to deenergize relay 336 thereby applying the CD on-signal to the down path signal line 18$_b$. Furthermore, the flip-flop circuit 342 is set thereby terminating the origination operation. At this time, the flip-flop circuit 340 is reset.

At the time of paging the paging data are sent to the mobile control unit 12 over the common control line so that the both way trunk line 103 operates in the same manner as above described.

The speech termination operation is effected in the following manner. When the subscriber of the ordinary telephone system firstly hooks on, the sequence controller 94 sets the flip-flop circuit 340 via the address decoder 300 to deenergize relay 336 whereby the CD on-signal is removed from the down path signal line 18$_b$.

Thereafter, the CU on-signal which has been applied to the up path signal line $18_a$ from the SPU 12 of the mobile control unit 71 is removed to render the signal line to be available. At this time, the flip-flop circuit 342 is set and the NAND gate circuit 343 is enabled by the output of the address decoder 300 so that its output is applied to the encoder 310 via inverter 344. The sequence controller 94 knows that the speech termination operation has been completed from the output of the encoder 310.

On the other hand, when the subscriber of the vehicle M firstly hooks on the CU on-signal is removed from the up path signal line $18_a$ and then the relay 336 is deenergized to remove the CD on-signal from the down path signal line $18_b$. For this reason, similar operations are made except that the sequence of operations is reversed from that when the hook on is firstly made on the side of the ordinary telephone system.

While the invention has been shown and described in terms of a preferred embodiment thereof it should be understood that many changes and modifications will be obvious to one skilled in the art without departing from the spirit and scope of the invention as defined in the appended claims.

What is claimed is:

1. In a mobile radio telephone system of the type wherein a service area of the system is divided into a plurality of radio zones, base stations are installed in respective radio zones, each of said base stations is connected to a control unit respectively through a common control channel and a plurality of speech channels, and said control unit is connected to an ordinary telephone network, a radio channel control system comprising a plurality of signal lines for carrying signaling information extending between each of said base stations and said control unit, each signal line being associated with a corresponding one of the plurality of speech channels, and each of said speech channels including speech lines and signal lines for carrying signaling information concerning the associated speech channel.

2. The radio channel control system according to claim 1 wherein each of said signal lines is used to transmit information regarding the presence or absence of an electric wave received by a speech channel while it is idle, from said base station to said control unit.

3. The radio channel control system according to claim 2 wherein said control unit comprises an idle speech channel memory device for storing the idle state of the speech channels, and means responsive to actual speech channel information sent from said base station via a signal line corresponding to an idle speech channel selected in accordance with an origination request for determining whether said idle speech channel should be selected for transmission of information.

4. The channel control system according to claim 2 which further comprises means for applying a ground signal and an interruption signal to said signal line.

5. The radio channel control system according to claim 2 wherein each base station comprises a speech channel receiver connected to an up path speech channel, means responsive to the output of said speech channel receiver for judging that whether said speech channel is being subjected to a wave interference or not, and means for applying the output of said judging means to one of said signal lines whereby said mobile control unit utilizes said output on said signal line as an information for selecting an idle speech channel in response to an origination request.

6. The radio channel control system according to claim 5 wherein said judging means comprises a level detector connected to receive a portion of the output of said receiver, an integrator for integrating the output of said level detector, and a first judging circuit which judges that there is a wave interference and produces an output when the output of said integrator persists over a predetermined time.

7. The radio channel control system according to claim 6 which further comprises a second judging circuit which produces an output when the output of said integrator persists over an interval longer than said predetermined time, a flip-flop circuit which is set by the output of said first judging circuit and reset by the output of said second judging circuit, and means for applying the set output of the flip-flop circuit to said signal line.

8. The radio channel control system according to claim 1 which further comprises means for transmitting a first signal for connecting a source to a transmitter of a base station when said signal line is selected as a speech channel, and means for transmitting a second signal for disconnecting said source from said control unit upon termination of speech.

9. The radio channel control system according to claim 8 wherein said first and second signals comprises a ground signal and a release signal respectively.

10. The radio channel control system according to claim 5 wherein each mobile base station comprises a speech channel transmitter connected to a down path speech channel, and control means responsive to a signal transmitted through said signal line for controlling the connection between said transmitter and an input signal source thereof, said control means including a relay responsive to one form of the signal transmitted through said signal line for connecting said source to said transmitter and a detector detecting another form of said signal for disconnecting said source from said transmitter.

11. The radio channel control system according to claim 10 wherein said source comprises a bias source of the transmitter.

12. The radio channel control system according to claim 10 wherein said source comprises a power output stage of the transmitter.

13. The radio channel control system according to claim 10 wherein said signal transmitted through said signal line is an off-signal for terminating a speech state when the mobile control unit is malfunctioning.

14. The radio channel control system according to claim 10 which further comprises an encoder responsive to the output of said detector for transmitting a speech channel interruption signal through said transmitter, and a timer for supplying a signal which turns off said source of said transmitter a predetermined time after transmission of said interruption signal.

15. The radio channel control system according to claim 2 wherein said mobile control unit comprises a scanner which scans signal lines corresponding to respective speech channels, an idle speech channel memory device for storing the idle state of respective speech channels, and a sequence controller which drives said scanner with a predetermined timing and compares the actual state of each speech channel with a corresponding content of said idle speech channel memory device thereby to detect a fault in said system when coincidence is not obtained.

16. The radio channel control system according to claim 15 wherein said last mentioned control includes a renewal of the content of said idle speech channel memory device with an actual state of said speech channel.

17. In a mobile radio telephone system of the type wherein a service area of the system is divided into a plurality of radio zones, base stations are installed in respective radio zones, each of said base stations are connected to a control unit respectively through a common control channel and a plurality of speech channels, said control unit is connected to an exchange unit which in turn is connected to an ordinary telephone network, a radio channel control system comprising a plurality of signal lines extending between each of said base stations and said control unit and between said control unit and said exchange unit, each of said plurality of signal lines being associated with a respective one of said speech channels.

18. The radio channel control system according to claim 17 wherein each of said signal lines is assigned to each of the speech channels in order.

19. The radio channel control system according to claim 17 wherein each of the signal lines extending between said base stations and said control unit is assigned to a respective one of the signal lines between said control unit and said exchange unit in order.

20. The radio channel control system according to claim 17 wherein said control unit comprises a scanner for scanning signal lines corresponding to respective speech channels, an idle speech channel memory device for storing the idle states of said speech channels, and a sequence controller for driving said scanner at a predetermined timing so as to compare the states of the signal lines extending between said base stations and said control unit and between said control unit and said exchange unit with the contents of said idle speech channel memory device thereby performing a fault processing when there is no coincidence.

* * * * *